US009485631B2

(12) United States Patent
Fraser

(10) Patent No.: US 9,485,631 B2
(45) Date of Patent: Nov. 1, 2016

(54) HOPPING MASTER IN WIRELESS CONFERENCE

(71) Applicant: Dominant Technologies, LLC, Mapleton, UT (US)

(72) Inventor: Ronald H. Fraser, Mapleton, UT (US)

(73) Assignee: Dominant Technologies, LLC, Mapleton, UT (US)

( * ) Notice: Subject to any disclaimer, the term of this patent is extended or adjusted under 35 U.S.C. 154(b) by 0 days.

(21) Appl. No.: 14/833,911

(22) Filed: Aug. 24, 2015

(65) Prior Publication Data

US 2016/0088447 A1 Mar. 24, 2016

Related U.S. Application Data

(63) Continuation of application No. 14/225,183, filed on Mar. 25, 2014, now Pat. No. 9,143,309, which is a continuation-in-part of application No. 13/863,282, filed on Apr. 15, 2013.

(60) Provisional application No. 61/751,727, filed on Jan. 11, 2013, provisional application No. 61/681,399, filed on Aug. 9, 2012, provisional application No. 61/623,662, filed on Apr. 13, 2012.

(51) Int. Cl.
*H04J 3/00* (2006.01)
*H04W 4/10* (2009.01)
*H04M 1/00* (2006.01)
*H04L 5/14* (2006.01)
*H04W 56/00* (2009.01)
*H04W 8/00* (2009.01)
*H04W 84/20* (2009.01)
(Continued)

(52) U.S. Cl.
CPC .............. *H04W 4/10* (2013.01); *H04L 5/1469* (2013.01); *H04M 1/00* (2013.01); *H04M 3/565* (2013.01); *H04W 8/005* (2013.01); *H04W 56/0015* (2013.01); *H04W 72/0446* (2013.01); *H04W 84/20* (2013.01); *H04J 3/0641* (2013.01); *H04W 72/0413* (2013.01)

(58) Field of Classification Search
CPC ...................................................... H04M 3/56
See application file for complete search history.

(56) References Cited

U.S. PATENT DOCUMENTS 6,178,323 B1 1/2001 Nagata
6,453,168 B1 9/2002 McCrady et al.
(Continued)

FOREIGN PATENT DOCUMENTS

WO 2009/134107 A2 11/2009

OTHER PUBLICATIONS

U.S. Office Action dated Jun. 3, 2015 for U.S. Appl. No. 13/863,282, all pages.
(Continued)

*Primary Examiner* — Huy D Vu
*Assistant Examiner* — Kevin Cunningham
(74) *Attorney, Agent, or Firm* — Kilpatrick Townsend & Stockton LLP

(57) ABSTRACT

A first radio has duplex communication with a second radio and a third radio, without using a base station by using a multiple-access protocol system. The first radio is configured to switch back and forth between being a master radio and a slave radio in the multiple-access protocol system. In some embodiments, time-division multiplexing is used as the multiple-access protocol system for the first radio, the second radio, and the third radio to communicate. In some embodiments, the master radio provides timing synchronization and/or assigns transmission slots for radios in the multiple-access protocol system.

20 Claims, 17 Drawing Sheets

(51) Int. Cl.
  *H04M 3/56* (2006.01)
  *H04J 3/06* (2006.01)
  *H04W 72/04* (2009.01)

(56) References Cited

U.S. PATENT DOCUMENTS

| | | | |
|---|---|---|---|
| 6,542,494 | B1 | 4/2003 | Sugaya et al. |
| 6,590,928 | B1 | 7/2003 | Haartsen |
| 7,054,436 | B2 | 5/2006 | Stenmark |
| 8,150,450 | B1 | 4/2012 | Wengrovitz |
| 8,526,645 | B2 | 9/2013 | Boilot et al. |
| 9,143,309 | B2 | 9/2015 | Fraser |
| 2001/0012757 | A1 | 8/2001 | Boyle |
| 2002/0067709 | A1 | 6/2002 | Yamada et al. |
| 2002/0141602 | A1 | 10/2002 | Nemirovski |
| 2003/0035406 | A1* | 2/2003 | Fraser ............... H04M 1/72502 370/347 |
| 2004/0037438 | A1 | 2/2004 | Liu et al. |
| 2004/0066940 | A1 | 4/2004 | Amir |
| 2005/0013456 | A1 | 1/2005 | Chalupper et al. |
| 2005/0111383 | A1 | 5/2005 | Grob et al. |
| 2005/0199723 | A1* | 9/2005 | Lubow ..................... G06K 1/18 235/462.01 |
| 2005/0206217 | A1 | 9/2005 | Koschel et al. |
| 2005/0281321 | A1 | 12/2005 | Bergstrom et al. |
| 2006/0281463 | A1* | 12/2006 | Yang ..................... H04W 36/18 455/442 |
| 2008/0057857 | A1 | 3/2008 | Smith |
| 2009/0149722 | A1 | 6/2009 | Abolfathi et al. |
| 2011/0106952 | A1 | 5/2011 | Doppler et al. |
| 2012/0058754 | A1 | 3/2012 | Course et al. |
| 2013/0272196 | A1 | 10/2013 | Li et al. |
| 2013/0329610 | A1 | 12/2013 | Fraser |
| 2014/0051472 | A1 | 2/2014 | Guo |
| 2014/0112175 | A1 | 4/2014 | Pantelidou et al. |
| 2014/0187283 | A1 | 7/2014 | Nimbalker et al. |
| 2014/0206322 | A1 | 7/2014 | Dimou et al. |
| 2015/0319797 | A1 | 11/2015 | Yamada et al. |
| 2016/0044704 | A1 | 2/2016 | Li et al. |

OTHER PUBLICATIONS

U.S. Office Action dated Dec. 9, 2015 for U.S. Appl. No. 13/863,282, all pages.
U.S. Office Action dated Dec. 13, 2005 for U.S. Appl. No. 10/194,115, all pages.
U.S. Office Action dated Oct. 16, 2013 for U.S. Appl. No. 13/961,647, all pages.
Science Blog, "New earbud design could eliminate listener fatigue" Science Blog.com, Published on May 13, 2011. Retrieved on Dec. 29, 2015, 3 pages. <http://scienceblog.com/45330/new-earbud-design-could-eliminate-listener-fatigue/#RoLmxMGApsolOdB.97>.
U.S. Appl. No. 14/961,621, "First Action Interview Pilot Program Pre-Interview Communication", mailed on Mar. 3, 2016, 8 pages.
PCT Patent Application No. PCT/US2015/064304, "International Search Report and Written Opinion", mailed on Mar. 29, 2016, 17 pages.

* cited by examiner

HOPPING MASTER IN WIRELESS CONFERENCE

CROSS-REFERENCES TO RELATED APPLICATIONS

This application is a continuation of U.S. patent application Ser. No. 14/225,183, filed on Mar. 25, 2014, entitled "Hopping Master In Wireless Conference," which application claims the benefit of and is a continuation-in-part of U.S. patent application Ser. No. 13/863,282, filed on Apr. 15, 2013, which claims priority to U.S. Patent Application No. 61/751,727, filed on Jan. 11, 2013, U.S. Patent Application No. 61/681,399, filed on Aug. 9, 2012, and U.S. Patent Application No. 61/623,662, filed on Apr. 13, 2012; each of which is expressly incorporated by reference in its entirety for all purposes.

BACKGROUND

This disclosure relates in general to radio communication, and more specifically, without limitation, to time-division multiplexed communication. Two-way radios enable wireless communication between two or more people. To operate, many radios require either a push-to-talk (PTT) button or a voice operated switch (VOX). For example, walkie-talkies today require either a PTT button or VOX. One disadvantage of both PTT and VOX is that both PTT and VOX communications are half-duplex. In half-duplex communication, a radio can either transmit or receive at a given time, not both. In this application, the term PTT radio generally refers to radios using half-duplex communication where a user can either speak or listen at a given time, not both.

Full-duplex communication, commonly referred to as duplex communication, permits a radio to simultaneously transmit and receive at the same time, enabling a user of a duplex radio to both speak and listen at the same time. One way a radio can operate in a duplex mode, without needing a PTT button or VOX, is by using a base station. An example of wireless radios connected by a base station, and thus enabling full-duplex communication, is two users talking to each other using cell phones. Another example of wireless radios connected by a base station is a home telephone system with wireless telephones that can be placed in a conferencing mode.

SUMMARY

Radios can operate in duplex communication without a base station using a multiple access protocol. For example, by using time-division multiplexing such as a time-division multiple access (TDMA) protocol radios can communicate with each other without using a base station. An example of radios communicating using a TDMA protocol system to create a wireless-conferencing system that does not use a base station is disclosed in U.S. patent application Ser. No. 10/194,115, filed on Jul. 11, 2002. A wireless-conferencing system that does not use a base station (e.g., using a multiple access protocol), and in some embodiments is similar to that disclosed in the '115 application, is referred to in this application as a multivoice system. A radio that is configured to operate in a wireless-conferencing system is referred to, in this application, as a multivoice radio or an MVR, or both. In some embodiments, a multivoice radio is simply referred to, in this application, as a radio because it is understood from the context that the radio is a multivoice radio part of a multivoice system. A multivoice system allows users to speak and listen, at the same time, to others using multivoice radios. In some embodiments, a multivoice system uses one or more multivoice radios to synchronize timing for other multivoice radios in the multivoice system. In this application, a multivoice radio that synchronizes timing for other multivoice radios and/or provides commands to other radios is referred to as a master. A multivoice radio that receives timing synchronization and/or commands from a master is referred to as a slave. Several embodiments of the present invention are directed toward a multivoice system that has an ability to change which radio in the multivoice system performs master function(s) (e.g., supplying timing information and/or sending commands to other radios in the multivoice system). Several embodiments of the present invention are directed toward how a master is initially created. Several embodiments are directed toward how one or more functions of a master are handed from one MVR to another MVR. Some embodiments are directed toward how two or more masters are created. Some embodiments are directed toward how a first master radio can join, or rejoin, as a slave or as a master, a wireless-conferencing system that has a master already.

In some embodiments, a multivoice radio is configured to be both a master radio and as a slave radio. In some embodiments, the multivoice radio switches, during operation, between being a master radio and a slave radio.

In some embodiments, a multivoice radio in a multivoice system acts as either a master or a slave after startup. A first radio comprises a receiver configured to receive wireless communication from a second radio and a third radio using time-division multiplexing. The first radio comprises a transmitter configured to transmit wireless communication to the second radio and to the third radio using time-division multiplexing. The first radio further comprises electronics configured to search for a wireless transmission from a master radio so that the multivoice voice radio can act as a slave; determine that the first radio did not receive a qualifying transmission from a master radio; and become a master radio based on not finding a master radio. In some embodiments a qualifying transmission is a transmission from another radio, received by the first radio, that has a power above a predetermined threshold. In some embodiments, acting as the master radio includes providing timing information for time-division multiplexing and/or assigning other radios to a transmission slot for time-division multiplexing.

In some embodiments, a first radio, acting as a slave in a multivoice system, transmits a request to a second radio, acting as a master in the multivoice system, for the first radio to become a master of the multivoice system. Some exemplary steps include: the first radio acts as a slave in the multivoice system; the first radio transmits a request to the second radio asking the second radio for the first radio to be master of the multivoice system; and the first radio starts performing master function(s) in the multivoice system. In some embodiments, the second radio acts as a slave in the multivoice system before, concurrently, and/or after the first radio starts performing master function(s) in the multivoice system.

In some embodiments, a first radio, acting as a master in a multivoice system, transmits a request to a second radio, acting as a slave in the multivoice system, for the second radio to become a master of the multivoice system. In some embodiments, this is done when the first radio receives a power-off command and/or a command to enter a listen-only mode. Some exemplary steps include: the first radio performs master functions; the first radio determines to pass off the master functions to a slave radio; the first radio transmits a request to the second radio, a slave in the multivoice system, for the slave to perform master functions; and the first radio receives confirmation from the second radio that the second radio will perform master functions.

In some embodiments, a first radio, acting as a slave in a multivoice system, becomes a master of the multivoice system when the first radio no longer receives communications from a second radio that was acting as the master in the multivoice system. Some exemplary steps include: the first radio acts as a slave in the multivoice system; the first radio determines that transmissions from the second radio are not being received; and the first radio determines to perform one or more master functions for the multivoice system based on not receiving transmissions from the second radio.

In some embodiments, a first radio, acting as a master in a first multivoice system, becomes a slave of a second radio, the second radio acting as a master in a second multivoice system. Some exemplary steps include: the first radio performs one or more functions in the first multivoice system; the first radio determines that the second radio is transmitting; the first radio determines to join the second multivoice system; and the first radio acts as a slave in the second multivoice system.

In some embodiments, a first radio, acting as a slave in a first multivoice system, switches to become a slave in a second multivoice system. Some exemplary steps include: the first radio acts as a slave to a second radio, the second radio acting as the master in the first multivoice system; the first radio receives transmissions from a third radio, the third radio acting as a master in the second multivoice system; a signal strength of transmissions from the third radio are stronger than a signal strength of transmissions from the second radio; and the first radio joins the second multivoice group, as a slave, based on the signal strength of transmissions from the third radio being stronger than the signal strength of transmissions from the second radio. In another example: the first radio acts as a slave to a second radio, the second radio acting as the master in the first multivoice system; the first radio receives transmissions from a third radio, the third radio acting as a master in the second multivoice system; the first radio compares received signal strengths from the second radio and the third radio; and the first radio determines to join the second multivoice group, as a slave, based on comparing received signal strengths from the second radio and the third radio.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1A:
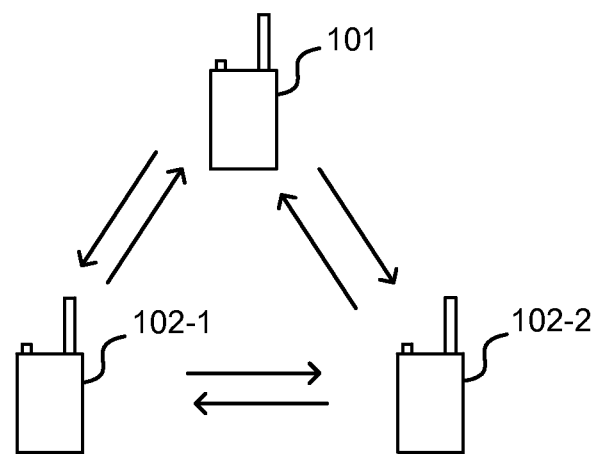
FIGS. 1A and 1B illustrate block diagrams of embodiments a multivoice system.
Figure 1B:
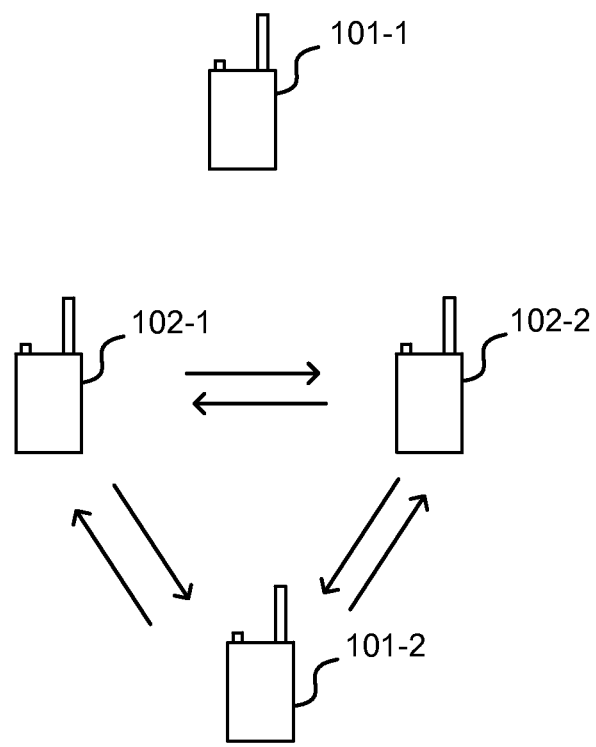

With reference to FIGS. 1A and 1B, block diagrams of embodiments a multivoice system are illustrated. In FIG. 1A, a diagram of an embodiment of a wireless-conferencing system forming a multivoice system is shown. The wireless-conferencing system comprises a master radio 101, a first slave radio 102-1, and a second slave radio 102-2. The master radio 101, the first slave radio 102-1, and the second slave radio 102-2 are MVRs. In this embodiment, the wireless-conferencing system uses time-division multiplexing, such as a time division multiple access (TDMA) protocol for the master radio 101 and the slave radios 102 to communicate with each other without using a base station. To implement TDMA, a time period is divided into a plurality of transmission slots. For example, a transmission slot could be about three milliseconds and there could be eight transmission slots for a twenty-four millisecond time period. An MVR transmits during none, one, or multiple transmission slots and receives transmissions (i.e., "listens") to other MVRs during one or more transmission slots. In some embodiments, an MVR transmits during only one transmission slot and listens during the remaining transmission slots. The master radio 101 performs one or more master functions. Examples of master functions include providing timing synchronization data (also referred to as timing data, synchronization data, and/or timing synchronization) for a multivoice system, assigning transmission slots to slave radios 102, assigning the master radio 101, itself, to one or more transmission slots, and sending other commands, such as for a slave to become a master.

In FIG. 1B, a diagram of an embodiment of a multivoice system having two master radios is shown. In this embodiment, a second master radio 101-2 (an MVR) is within range of the first slave radio 102-1 and the second slave radio 102-2. The first slave radio 102-1 and the second slave radio 102-2 have switched from a first multivoice system where the first master 101-1 performs master function(s) to a second multivoice system where the second master radio 101-2 performs master function(s). In some embodiments, the first master 101-1 still receives transmissions form the first slave 102-1 and/or the second slave 102-2, but the first master 101-1 does not transmit to the first slave 102-1 and/or the second slave 102-2. In some embodiments, the first master 101-1 will join, as a slave, the second multivoice system. In some embodiments below, different scenarios are described how a multivoice radio determines if the multivoice radio is going to be a master radio 101 or a slave radio 102; how a master radio 101 becomes a slave radio 102; how a slave radio 102 becomes a master radio 101; and how a slave radio 102 determines whether to stay in a multivoice system with the first master radio 101-1 or to switch to a multivoice system with the second master radio 101-2.

Figure 1C:
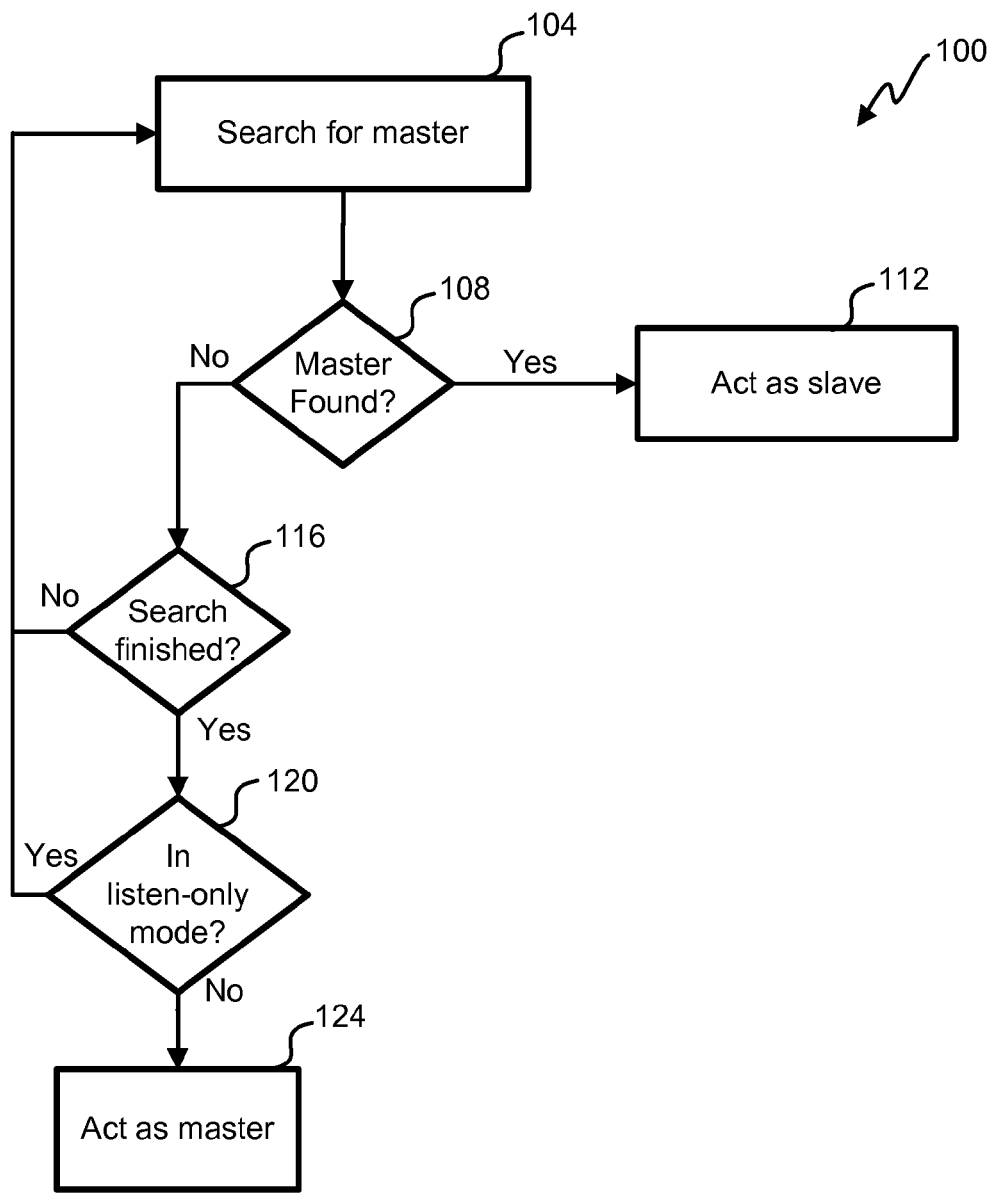
FIGS. 1C and 1D illustrate flowcharts of embodiments of processes for a multivoice radio becoming a master radio or slave radio at startup.
Figure 1D:
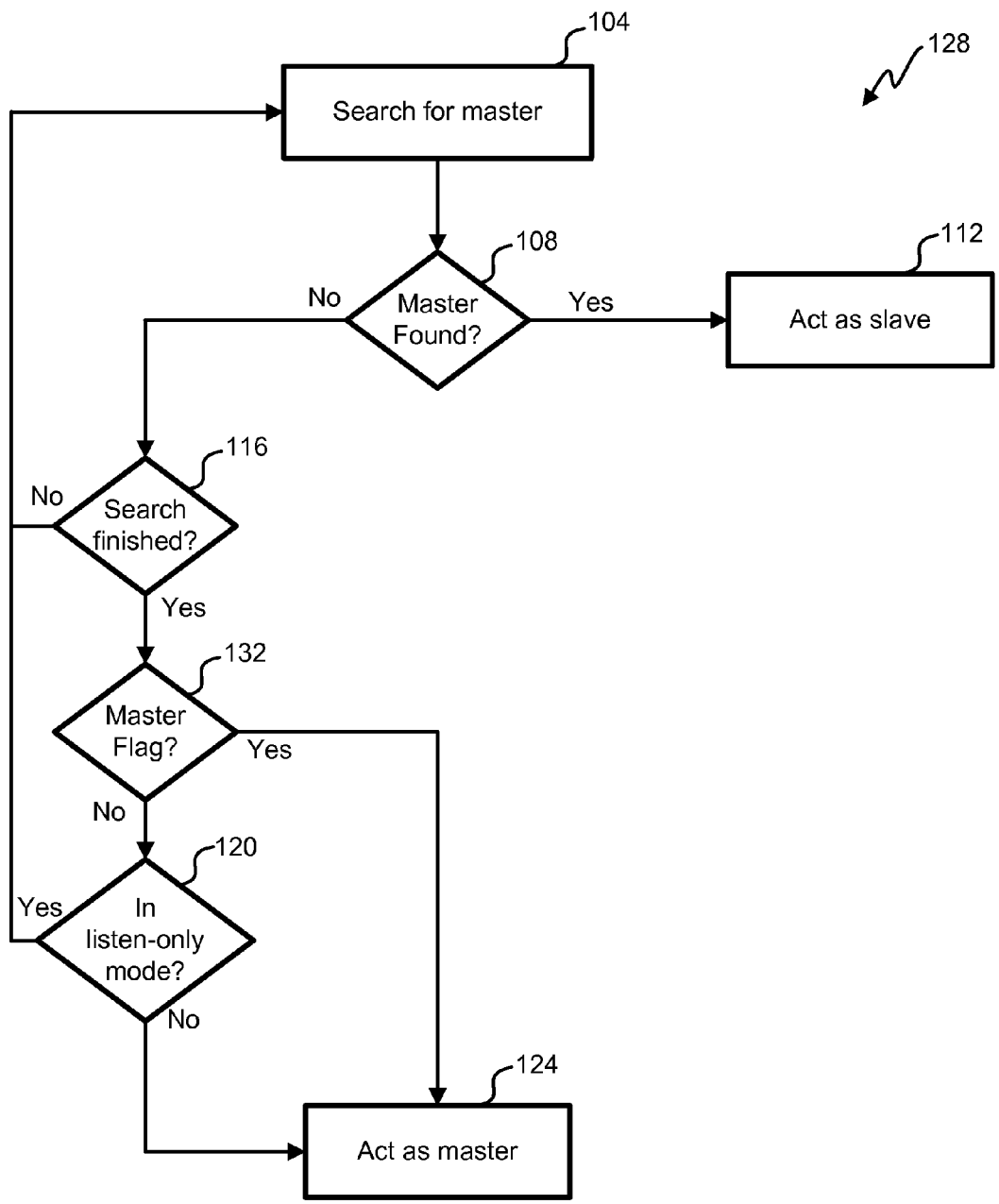

With reference to FIGS. 1C and 1D, flowcharts of embodiments of processes for a multivoice radio becoming a master radio, or slave radio, at startup are shown. In FIG. 1C, after a multivoice radio is turned on, and/or initialized, process 100 begins with the multivoice radio searching for a master radio, step 104. The multivoice radio searches for the master radio by waiting to receive transmission from the master radio. At step 108, the multivoice radio determines whether or not a master radio is found. If a master radio is found at step 108, the multivoice radio synchronizes with the master radio, thus acting as a slave to the master radio, step 112. In some embodiments, the multivoice radio synchronizes with the master radio by receiving a transmission-slot assignment from the master radio. In some embodiments, the multivoice radio synchronizes with the master radio and acts as a slave by receiving timing data from the master radio. In some embodiments, the master radio is considered found, in step 108, if the multivoice radio receives a transmission from the master radio that has a power exceeding a predetermined threshold. In some embodiments, the multivoice radio will take a plurality of power measurements from the master radio transmission over multiple transmissions and determine if the power measurements are increasing or decreasing. In some embodiments, if the power is increasing, then the master is found; if the power is decreasing then the master is not found. In some embodiments, if a measurement of the plurality of measurements is above the threshold, but the power measurements are decreasing, then the multivoice radio may take further measurements or determine that the master radio is not found.

If a master radio is not found at step 108, then the multivoice radio continues to search for a master until step 116 indicates that a time for searching is complete. The time for searching may be generated by a timer, a number of search sequences, or other means for determining that a master radio is not in the area. Once the time for searching, step 116, is finished and a master radio is not found, process 100 continues to step 120 where the multivoice radio determines if the multivoice radio is in listen-only mode. In some embodiments, listen-only mode is determined by a microphone of the multivoice radio being connected or disconnected. If the microphone is disconnected, then the multivoice radio is in listen-only mode. In some embodiments, whether or not the multivoice radio is in listen-only mode in step 120 is determined by a mute button or switch that is triggered. A multivoice that is in listen only mode at step 120 continues to search for a master, 104. A multivoice radio that is not in listen-only mode at step 120 continues to act as master for a multivoice system, step 124. In some embodiments, a multivoice radio has a software and/or hardware flag that prevents the multivoice radio from becoming a master, which, in some embodiments, would be equivalent to the multivoice radio being in listen-only mode at step 120.

FIG. 1D illustrates a flowchart of an embodiment of process 128 that shows added functionality using an MVR parameter. MVR parameters can be in hardware (e.g., a jumper or switch) and/or software. One MVR parameter is a master flag parameter. The master flag parameter indicates that the multivoice radio has preference to be a master radio of a multivoice system. When the master flag parameter is set (e.g., by a jumper, or software code set to "yes," "1," and/or "on") then the multivoice radio has preference to become the master radio. After a multivoice radio is turned on, and/or initialized, the multivoice radio enters process 128 at step 104, and searches for master. In step 108, the multivoice radio determines if a master radio is found or not. If a master radio is found, the multivoice radio synchronizes with the master radio and acts as a slave, step 112. If a master is not found at step 108, then the multivoice radio continues to search for a master radio until step 116 indicates that the time for searching is complete. Once the search is finished, step 116, and a master is still not found, the multivoice radio determines whether or not the master flag parameter is set, step 132. If the master flag parameter is set, then process 128 proceeds to step 124 and the multivoice radio acts as a master. In some embodiments, if the master flag parameter is not set, then at step 120 the multivoice radio determines if the multivoice radio is in listen-only mode. If the multivoice radio is in listen-only mode, then the multivoice radio continues to search for a master, step 104. If the multivoice radio is not in listen-only mode, the multivoice radio acts as a master, step 124.

Figure 1E:
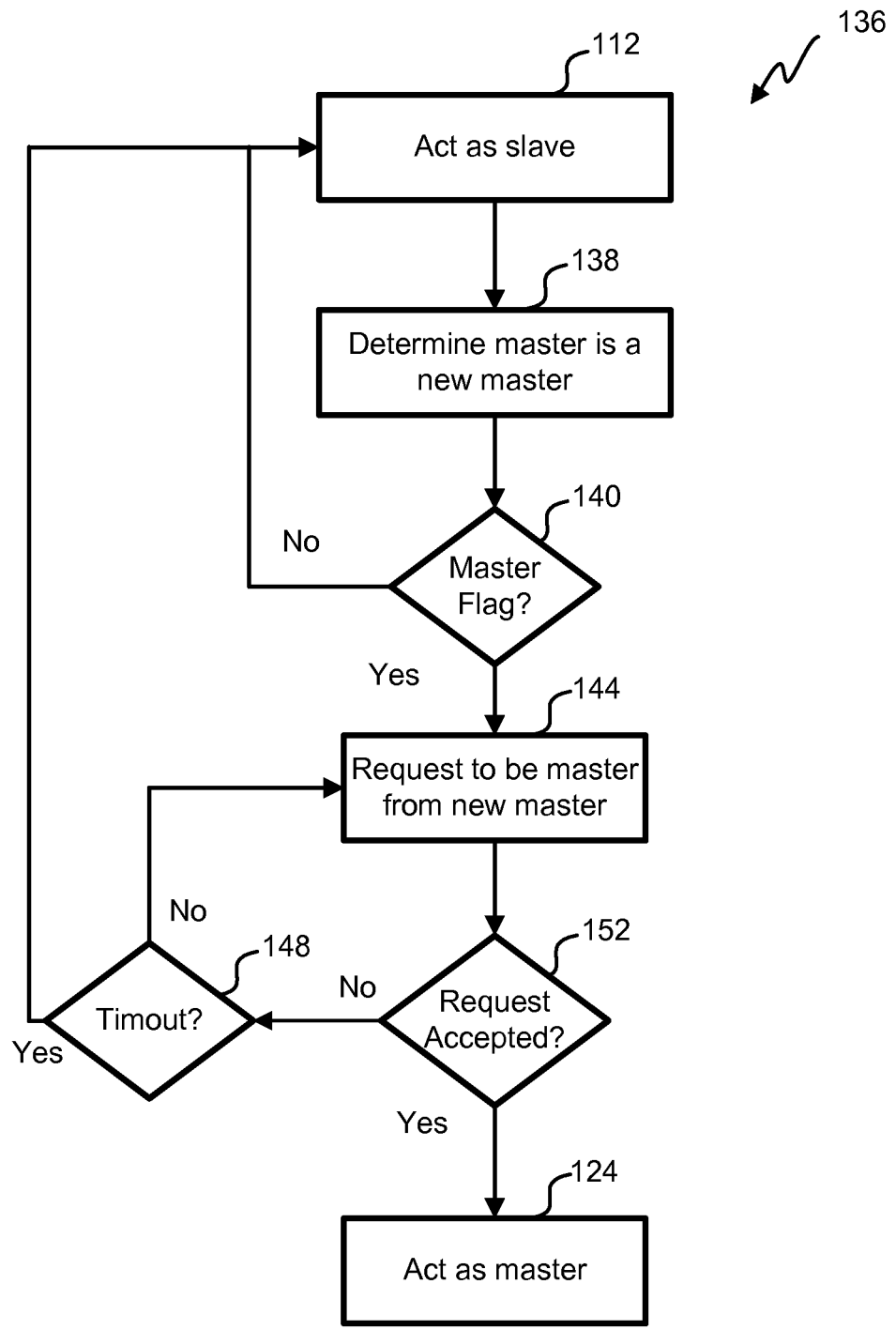
FIG. 1E illustrates a flowchart of an embodiment of a process for a slave radio to request becoming a master after joining a new multivoice system or after another radio becomes a master of an existing multivoice system.

With reference to FIG. 1E, a flowchart of an embodiment of a process 136 for a slave radio to request becoming a master after joining a new multivoice system, or after another radio becomes a master of an existing multivoice system, is shown. Process 136 begins in step 112 where the multivoice radio acts as a slave. For example, a multivoice radio, from process 128, finds a master radio after step 108 and acts as a slave radio in step 112. In step 138, the multivoice radio determines the master radio is a new master. The master radio could be a new master because the multivoice radio recently activated, as in process 128. In some embodiments, step 138 is skipped. For example, a radio with the master flag parameter is in listen-only mode. When the radio with the master flag parameter exits listen-only mode, the radio with the master flag parameter proceeds to step 144 to request to be a master because the master flag parameter is set. In some embodiments, a new master is determined when a second radio (an MVR) takes over master function(s) from a first radio (also an MVR).

Several processes are given below that provide examples how a second radio takes over master function(s) from a first radio. After a determination is made that the master radio is a new master, step 138, the process 136 flows to decision 140 where the multivoice radio determines whether or not the master flag parameter is set for the multivoice radio. If the master flag is not set, the multivoice radio continues to act as a slave, step 112. If the master flag parameter is set, in step 140, the process 136 flows to step 144 where the multivoice radio requests to be master of the multivoice system from the new master. The multivoice radio waits for the request to be master of the multivoice system to be accepted by the master radio, step 152. If the request is accepted, the multivoice radio assumes the master function(s) and acts as a master, step 124. In some embodiments, the master radio sends a signal to the multivoice radio when the request is accepted. If the request is not accepted in step 152, the process 136 flows to step 148 where the multivoice radio determines whether or not a timeout period for the request has expired. The timeout period can be determined by a lapse of time, a number of search sequences, a number of time periods, or other timing method. If the timeout period has expired, the multivoice radio continues to act as a slave, step 112. If the timeout period has not expired, then process 136 returns to step 144 and the multivoice radio either makes a new request to the master radio to become master, or the multivoice radio simply waits for the timeout period to expire. In some embodiments, the multivoice radio waits for a response from the master radio that the master radio has accepted or rejected the request in step 144, instead of using a timeout period, step 148. In some embodiments, step 148 is bypassed and the multivoice radio keeps requesting (e.g., each cycle) to act as master until the multivoice radio receives a response from the master radio (and/or the master stops transmitting during a known transmission slot).

Figure 1F:
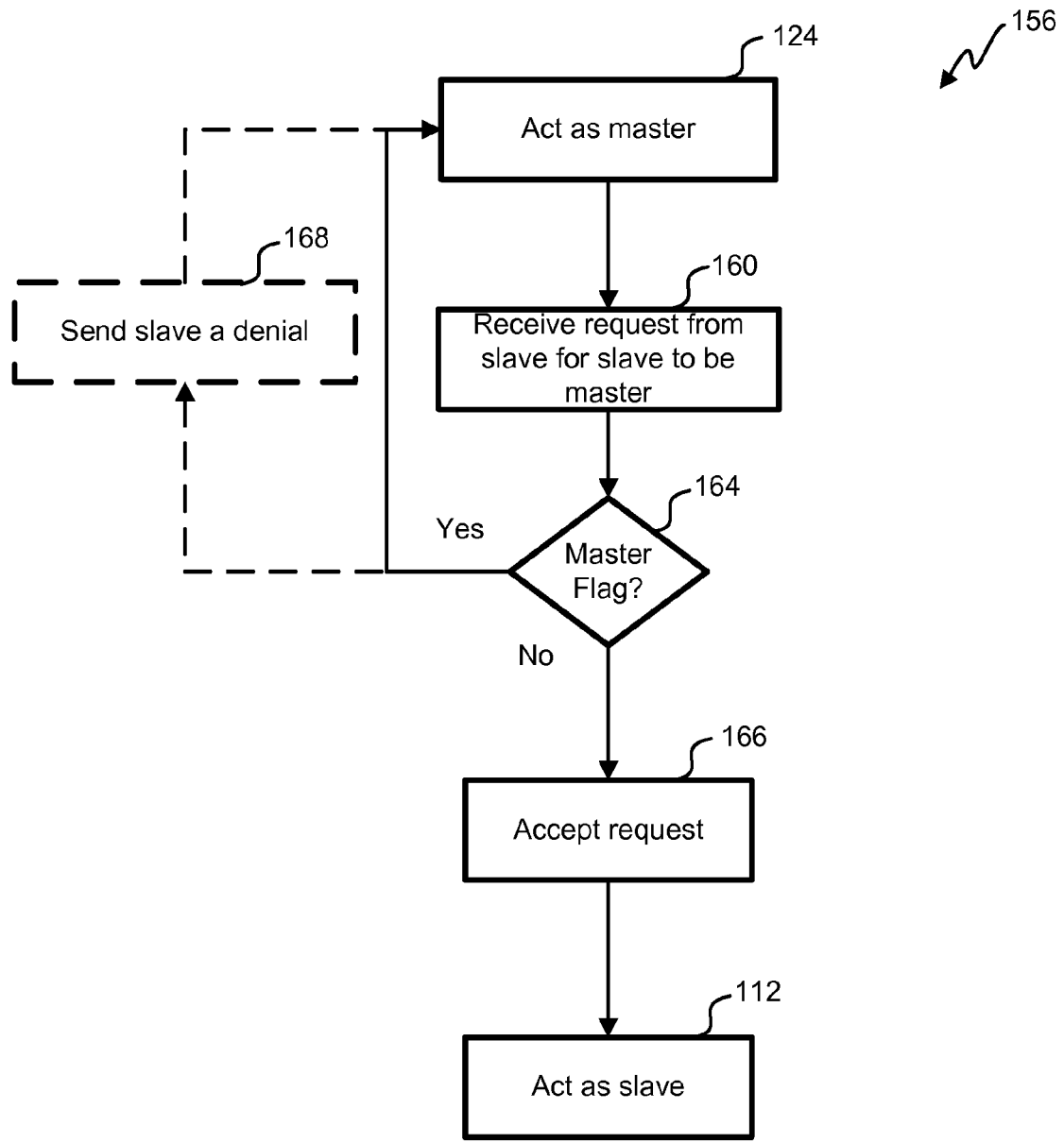
FIG. 1F illustrates a flowchart of an embodiment of a process for a multivoice radio that is acting as a master to become a slave.

With reference to FIG. 1F, a flowchart of an embodiment of a process 156 for a master radio to receive a request from a slave radio for the slave radio to become a master is shown. Process 156 begins in step 124 where a multivoice radio acts as a master radio for a multivoice system. In step 160, the multivoice radio receives a request from a second radio (an MVR), the request from the second radio is for the second radio to become the master of the multivoice system. The multivoice radio determines if the multivoice radio has the master flag parameter set, step 164. If the multivoice radio does not have the master flag parameter set, then the multivoice radio accepts the request from the second radio for the second radio to take over master function(s) for the multivoice system, step 166; and the multivoice radio acts as a slave in the multivoice system, step 112. In some embodiments, the multivoice radio assigns itself a new transmission slot before giving master function(s) to the second radio. In some embodiments, the multivoice radio transitions master function(s) to the second radio and then asks the second radio for a transmission slot.

If in step 164 the multivoice radio determines the master flag parameter is set, then the multivoice radio continues to act as master, returning back to step 124. In some embodiments, if the master flag parameter is set for the multivoice radio, then the multivoice radio transmits a denial to the second radio, step 168, in response to the request from the second radio.

In a wireless conference system that has no base station, one of the transceivers acts as a master as disclosed in the '115 application. In the '115 application, one of the radios is programmed to be a master radio and the master radio lacks the capability to switch between being a master and a slave. In some applications, having the master function(s) able to switch between multiple radios can be important. For example, in a multivoice system of the '115 application, if the master radio were to be turned off, the multivoice system would stop functioning and slave radios in the multivoice system would lose an ability to communicate with each other. However, having another radio take over master function(s) would keep the multivoice system working. For example, if a SWAT team entered a building, and the master radio, outside the building, turns off or gets out of range from slave radios, under the multivoice system in the '115 patent, SWAT team members inside the building having slave radios would not be able to communicate via the slave radios. Under some embodiments in this disclosure, if the master radio is turned off, another radio takes over as the master radio to keep the multivoice system working.

Figure 2A:
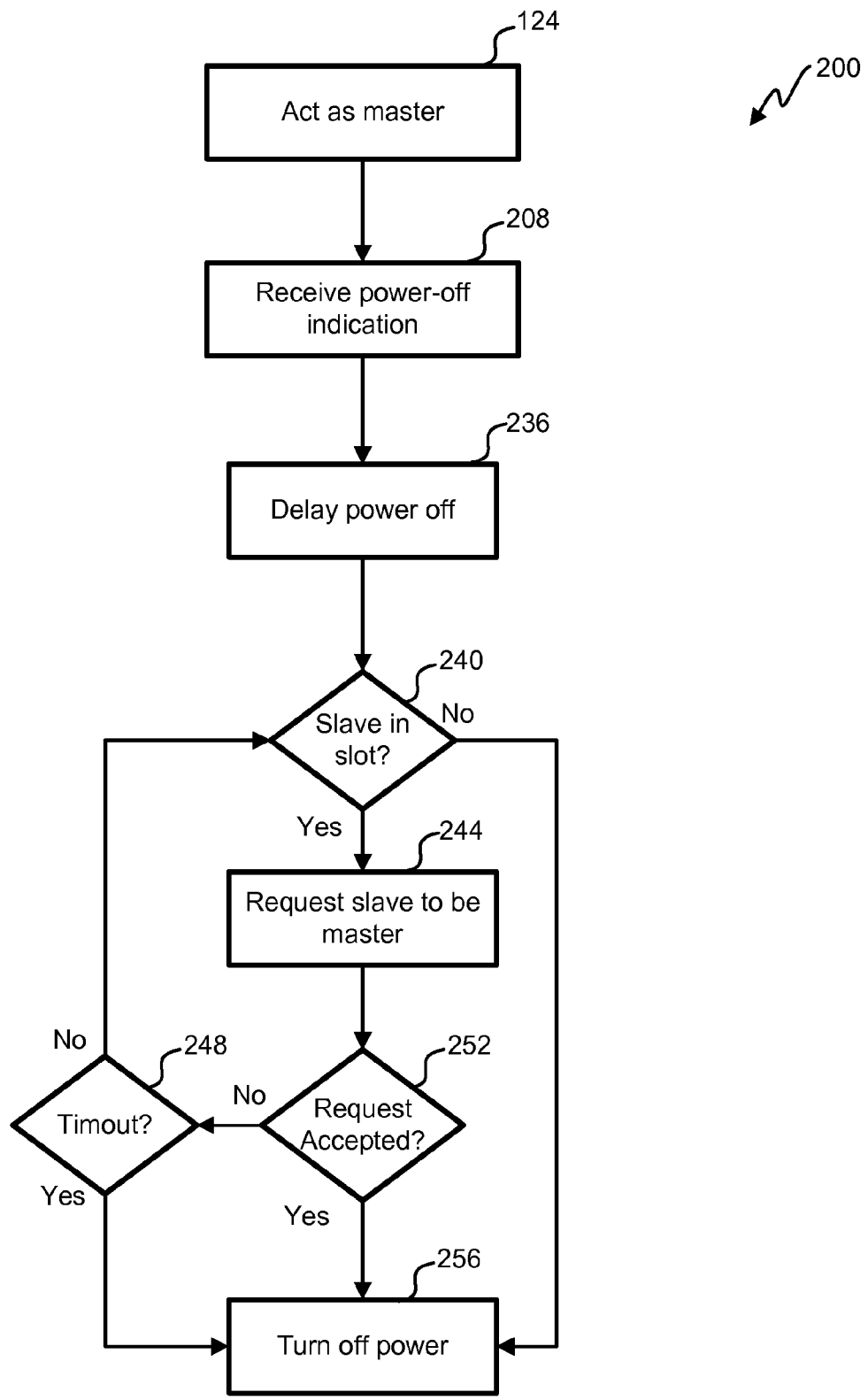
FIG. 2A illustrates a flowchart of an embodiment of a process for a master radio in a multivoice system to hand off master function(s) to a slave radio at power off.

FIG. 2A illustrates a flowchart of an embodiment of a process 200 that shows a first radio handing off master function(s) in a multivoice system to a second radio when the first radio is powered off. The first radio and the second radio are MVRs. Process 200 begins with the first radio acting as a master, step 124. The process flows to step 208 where the first radio receives a power-off indication. In some embodiments, a keypad is used to turn the first radio off. In some embodiments, a switch is used to turn the first radio off. In some embodiments, processes in the keypad keep power on long enough to hand master function(s) to a slave radio in the multivoice system. In some embodiments, other techniques are used to hold the power on until master function(s) are handed off. In some embodiments, the master radio may just stop working and a slave will take over as a master based on the master radio no longer transmitting. When the power-off indication is received in step 208, process 200 flows to step 236 where actual power off of the radio is delayed. After step 236, in step 240 it is determined whether or not there are any slaves assigned to a transmission slot. If there are no slaves in a transmission slot in step 240, power is turned off for the first radio, step 256.

However, if there are slaves in a transmission slot in step 240 (or if there is a radio that can become a master), process 200 flows to step 244 where the first radio requests a slave to take over the master function(s) for the multivoice system. If a slave (i.e., the second radio) accepts the request to take over the master function(s), step 252, then the first radio powers off, step 256. In some embodiments, before powering off, the first radio transmits confirmation to the second radio and/or all radios in the multivoice system that the second radio is take over the master function(s). If the request is not accepted in step 252, the first radio waits for a timeout period, step 248. If the timeout period in step 248 expires, the then first radio powers off, step 256. But if the timeout period in step 248 has not expired, then process 200 returns to step 240 and the first radio determines whether there is a slave assigned to a transmission slot (or if there is a radio that can perform master function(s)). In some embodiments, when there are two or more slaves, the first radio asks each slave sequentially, based on transmission-slot assignment, to take over the master function. In some embodiments, the first radio transmits a request to all slave radios at once and accepts a first slave that responds. In some embodiments, an additional step is added to process 200 where after a slave accepts the request to take the master function(s), the first radio acknowledges to the slave that the first radio received the slave's acceptance.

Figure 2B:
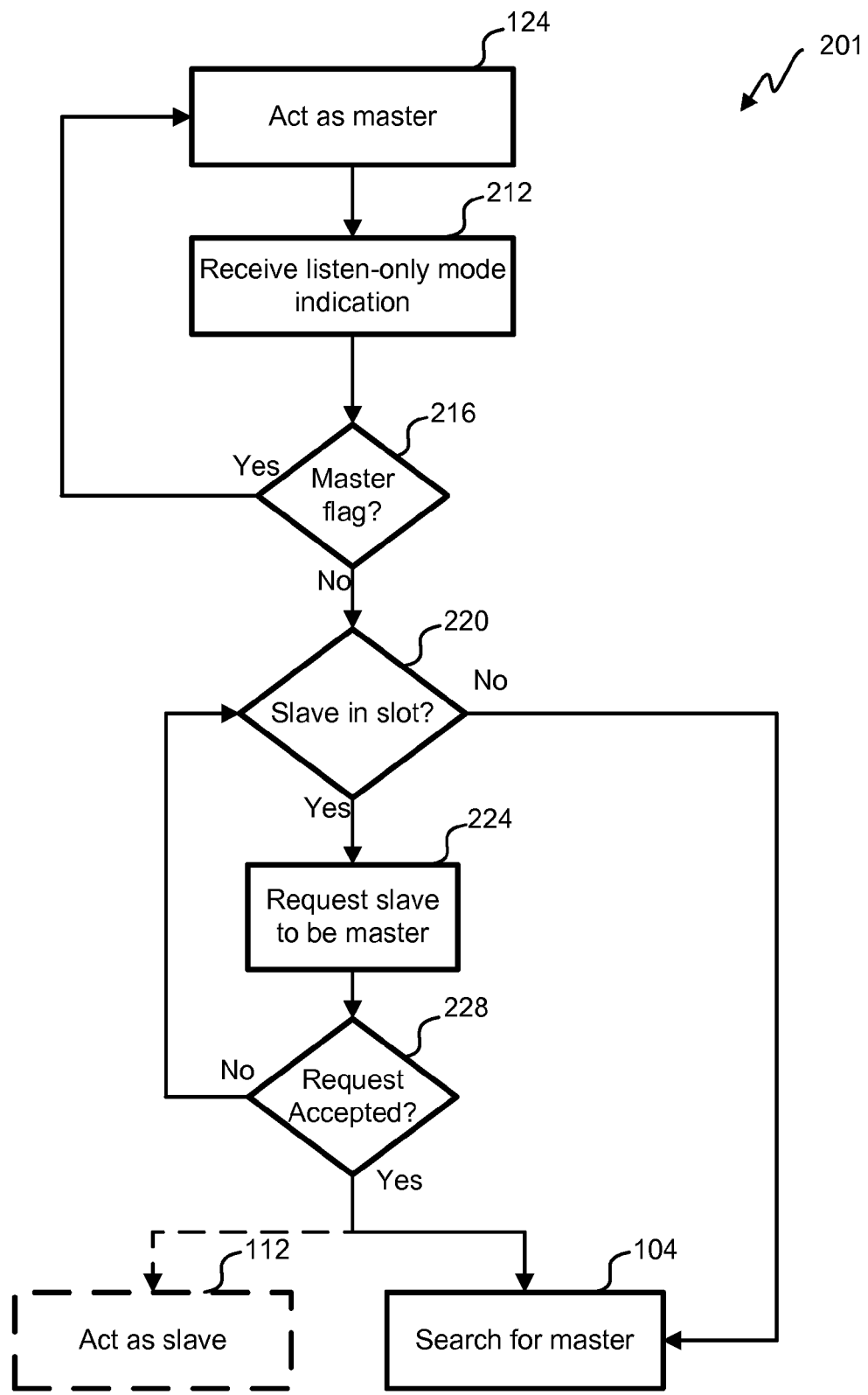
FIGS. 2B and 2C illustrate flowcharts of embodiments of processes for a master radio in a multivoice system to hand off master function(s) to a slave radio when entering listen-only mode.
Figure 2C:
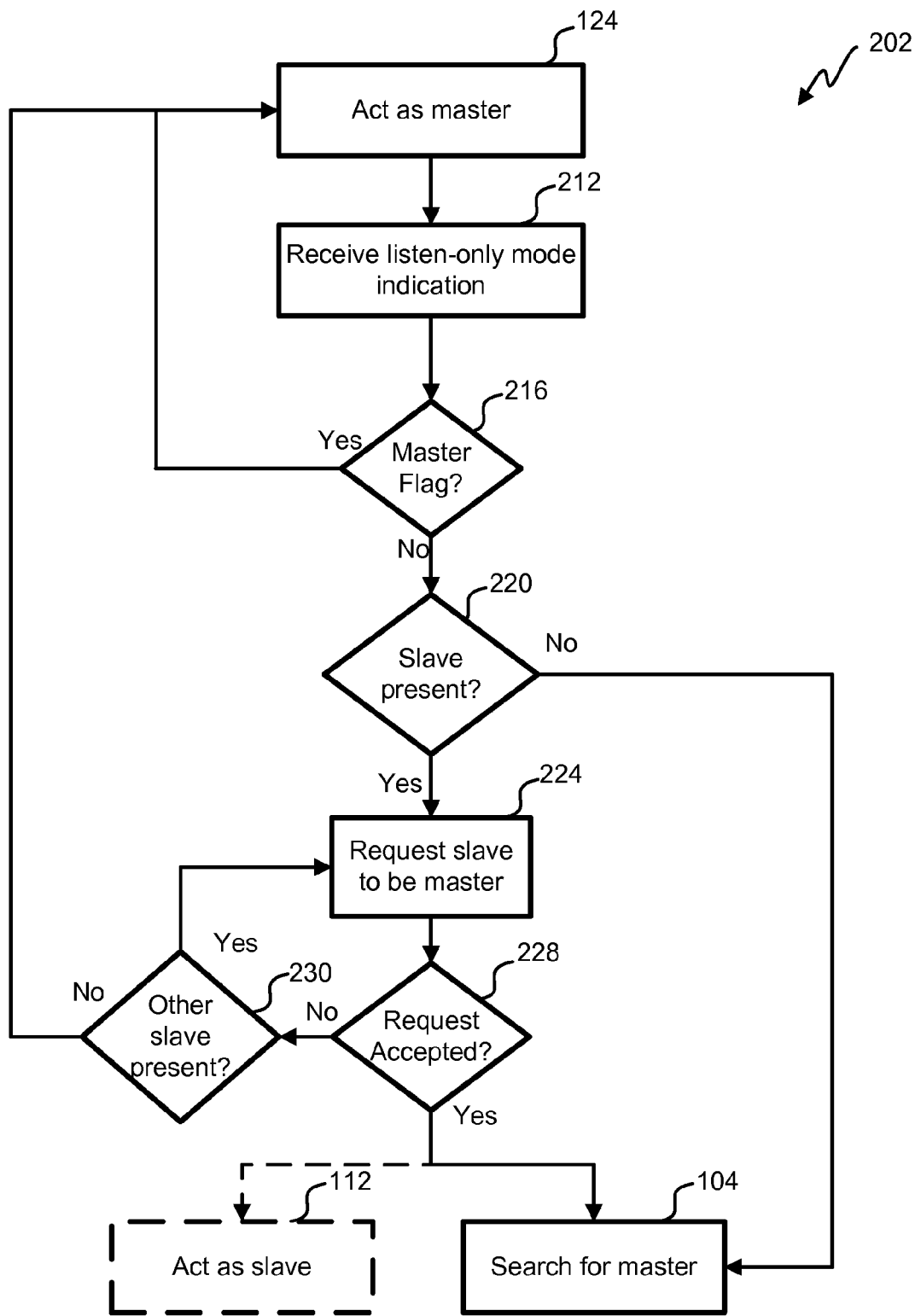

With reference to FIGS. 2B and 2C, flowcharts of embodiments of processes for a master radio in a multivoice system to hand off master function(s) to a slave radio when entering listen-only mode are shown. In FIG. 2B, process 201 starts in step 124 where a multivoice radio acts as a master radio for a multivoice system. Process 201 flows from step 124 to step 212 where the multivoice radio receives a listen-only mode indication. The listen-only mode indication could be a user toggling a switch or pushing a button. In some embodiments, the listen-only mode indication is activated by a microphone being unplugged or disabled. In the listen-only mode, a radio may receive transmission of other radios but does not transmit audio communication during a transmission slot. When the multivoice radio receives the listen-only mode indication, the multivoice radio determines whether or not the master flag parameter is set, step 216. If the master flag parameter is set then process 201 returns to step 124 and the multivoice radio continues to act as master. In some embodiments, a master radio that is in listen-only mode can still serve as a master and transmit data, but the master radio does not transmit audio information. In some embodiments, a master radio that is in listen-only mode can still serve as a master and transmit data, but the master radio is not assigned to a transmission slot to transmit audio communication; instead, the master radio is assigned a transmission slot to transmit data.

If in step 216 the master flag parameter is not set, then process 201 flows to step 220 where a determination is made whether or not a slave radio occupies a transmission slot. If there are no slave radios that occupy a transmission slot, then the multivoice radio searches for a master, step 104. But if there is a slave in a transmission slot in step 220, then the multivoice radio requests the slave, a second radio, to take over the master function(s), step 224. In some embodiments, the multivoice radio asks all slaves at once that have transmission slots to take the master function(s), but confirms with only one slave to take the master function(s). If, in step 228, the request for the second radio to take over the master function(s) is accepted, then the multivoice radio searches for a master, step 104 (and will presumably find the second radio acting as a master radio); or, in some embodiments, the multivoice radio acts as a slave, step 112, to the second radio.

If the request in step 228 is not accepted, then process 201 flows to step 220 where the multivoice radio checks whether there are any slave radios in a transmission slot, and if so, asks one of the slaves to take the master function(s). In some embodiments, if the request, in step 224, is not accepted after a certain timeout period, the multivoice radio searches for a master, step 104.

Process 202 in FIG. 2C is similar to process 201 in FIG. 2B, except after step 228, the second radio does not accept the request for the second radio to take the master function(s) then the process 202 flows to step 230 where the multivoice radio determines whether or not there are other slaves present (i.e., besides the second radio). If there are no other slaves present, then the multivoice radio retains the master function(s) and acts as a master 124. But if there are other slaves present (i.e., a third radio, wherein the third radio is assigned to a transmission slot), then process returns to step 224 and the multivoice radio asks the third radio for the third radio to take the master function(s). A loop of steps 224, 228, and 230 continues until the multivoice radio has asked all radios assigned to a transmission slot to take the master function(s); and if there are no other slaves present that have not been asked to take the master function(s), the process 202 returns to step 124, where the multivoice radio continues to act as master. In some embodiments, the multivoice radio searches for a master, step 104, instead of returning to step 124 as described in the previous sentence if the request for another slave to be master is not accepted.

Figure 3:
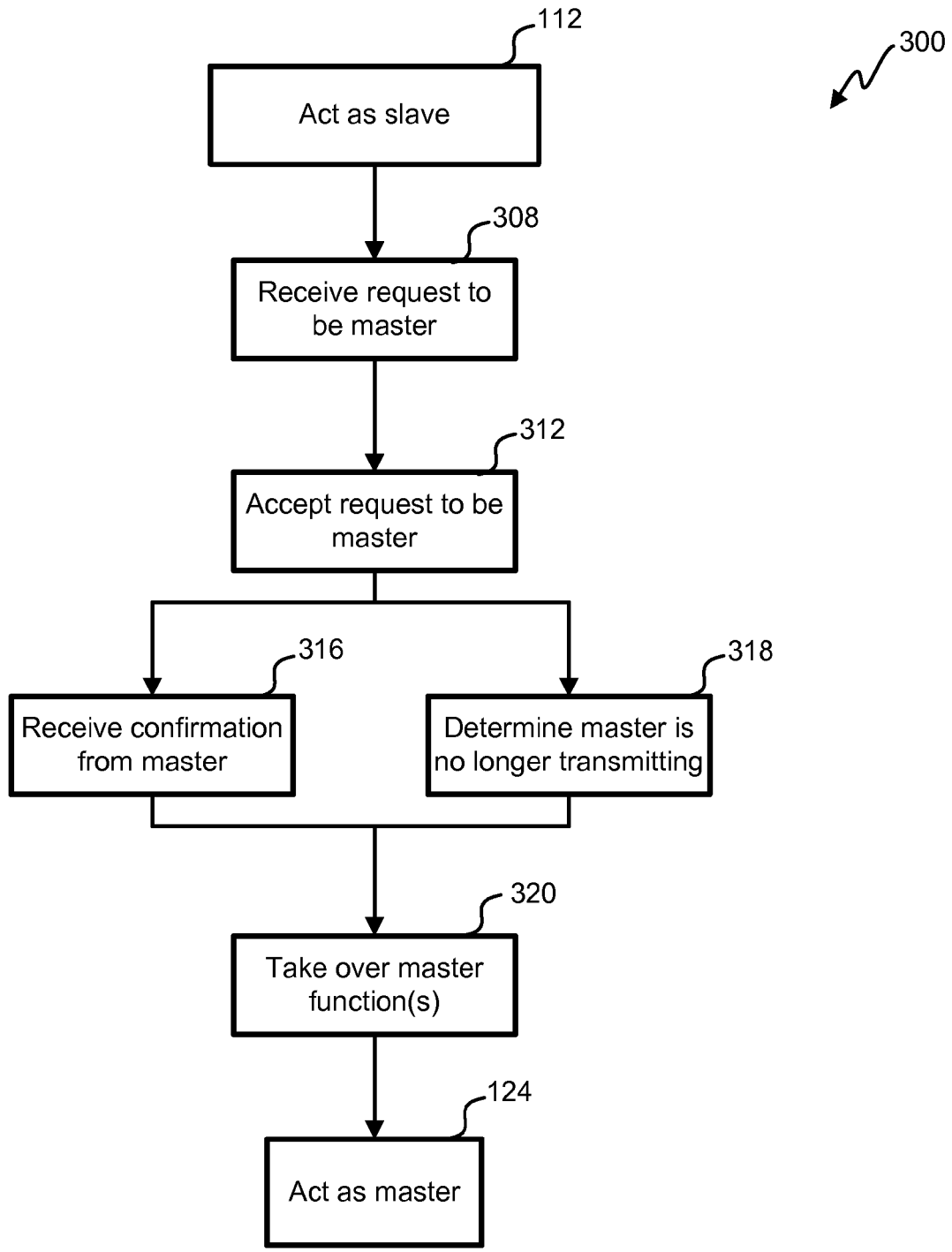
FIG. 3 illustrates a flowchart of an embodiment of a process for a slave radio in a multivoice system to take over master function(s) after being requested to do so.

FIG. 3 illustrates a flowchart of an embodiment of a process 300 for a slave radio in a multivoice system to take over master function(s) after being requested to do so. Process 300 begins in step 112 where a multivoice radio acts as a slave in the multivoice system. A transceiver of the multivoice radio is used to determine that a second radio, acting as the master radio, is transmitting a request for the multivoice radio to take over the master function(s), step 308. In some embodiments, a slave radio may be asked to be the master if the slave radio is next in line to become the master based on some algorithm (e.g., round robin, transmission-slot sequence, or known master flag parameters) and/or based on no other slave being available to become the master. If in step 308 the multivoice radio determines that the second radio is asking for the multivoice radio to be the master, then the multivoice radio accepts the request for the multivoice radio to become master, step 312. In step 312, a signal may be sent from the multivoice radio to the second radio to indicate acceptance. In some embodiments, the second radio stops transmitting during an assigned transmission slot to accept the request, step 312, for the multivoice radio to be master.

After step 312, two tests exist, steps 316 and 318, before the multivoice radio takes over master function(s) in step 320. In step 316, the multivoice radio receives confirmation from the second radio that the multivoice radio is to become master, and the multivoice radio takes over master function(s), step 320. In step 318, the multivoice radio determines that the second radio is no longer transmitting. In some embodiments, the master radio is assigned to transmit on a first transmission slot. If no radio transmits on the first transmission slot, then the multivoice radio determines that the second radio is no longer transmitting as master of the multivoice system. After the multivoice radio determines the master is no longer transmitting, step 318, then the multivoice radio takes over master function(s), step 320. In some embodiments, taking over master function(s) includes transmitting during a transmission slot that the master is normally assigned to. After the multivoice radio takes over master function(s) in step 320, the multivoice radio the acts as master, step 124. In some embodiments, taking over master function(s) and/or acting as master includes broadcasting to radios in the multivoice system that the multivoice radio is now acting as master. In some embodiments, taking over master function(s) and/or acting as master includes receiving an acknowledgement from a previous master for the multivoice radio to take over master function(s). In some embodiments, either test found in step 316 or in step 318, when satisfied, is sufficient for the multivoice radio to take over master function(s), step 320. In some embodiments, both tests found in step 316 and in step 318 must be satisfied before the multivoice radio takes over master function(s) in step 320. In some embodiments, steps 316 and/or 318 are bypassed and once the multivoice radio accepts the request to be master, step 312, process flows to step 320 where the multivoice radio takes over master function(s).

Figure 4A:
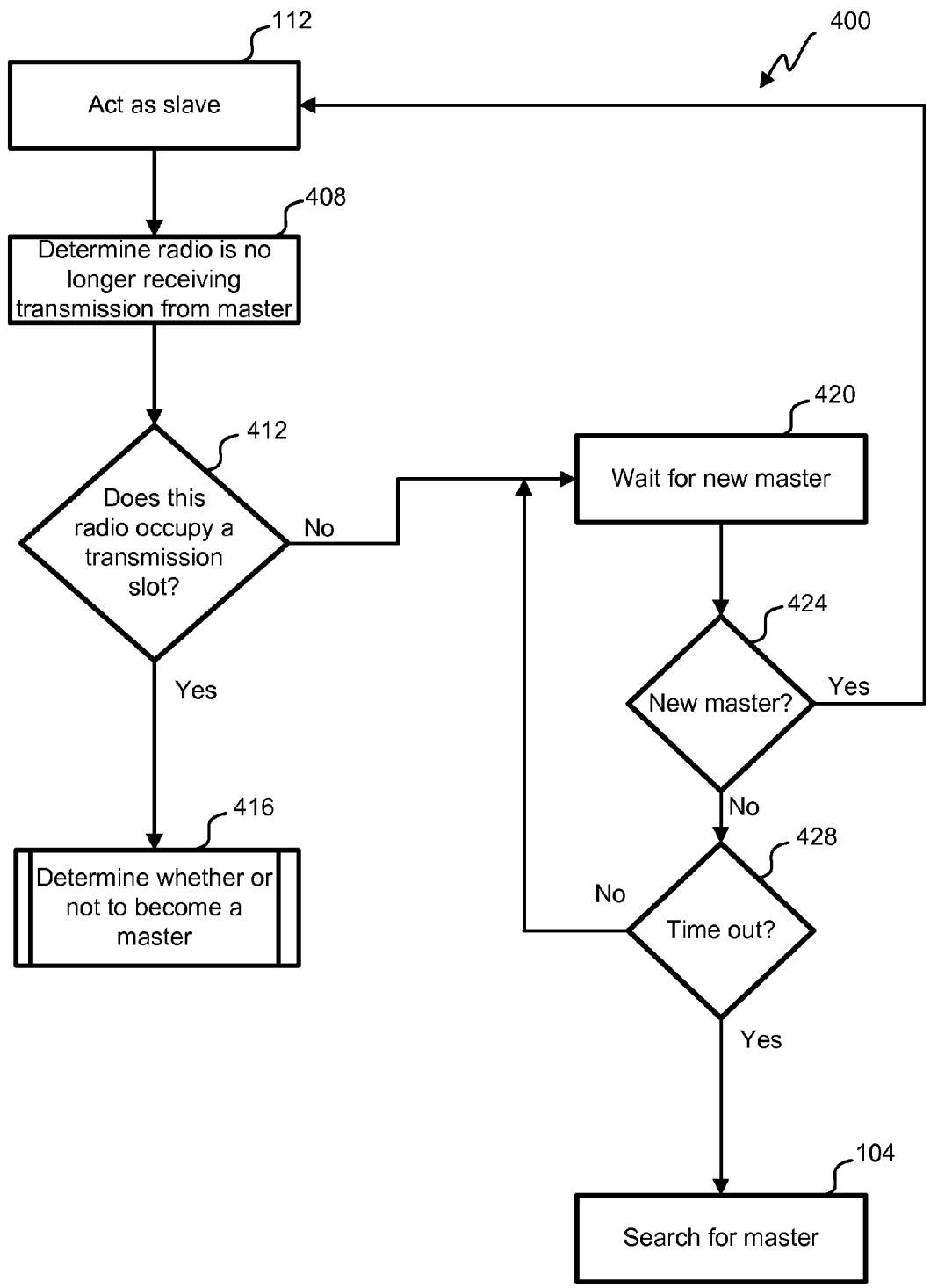
FIGS. 4A-4D illustrate flowcharts of embodiments of processes for a multivoice radio, acting as a slave in a multivoice system, to act as a master radio in the multivoice system upon determining the previous master radio is no longer transmitting.
Figure 4B:
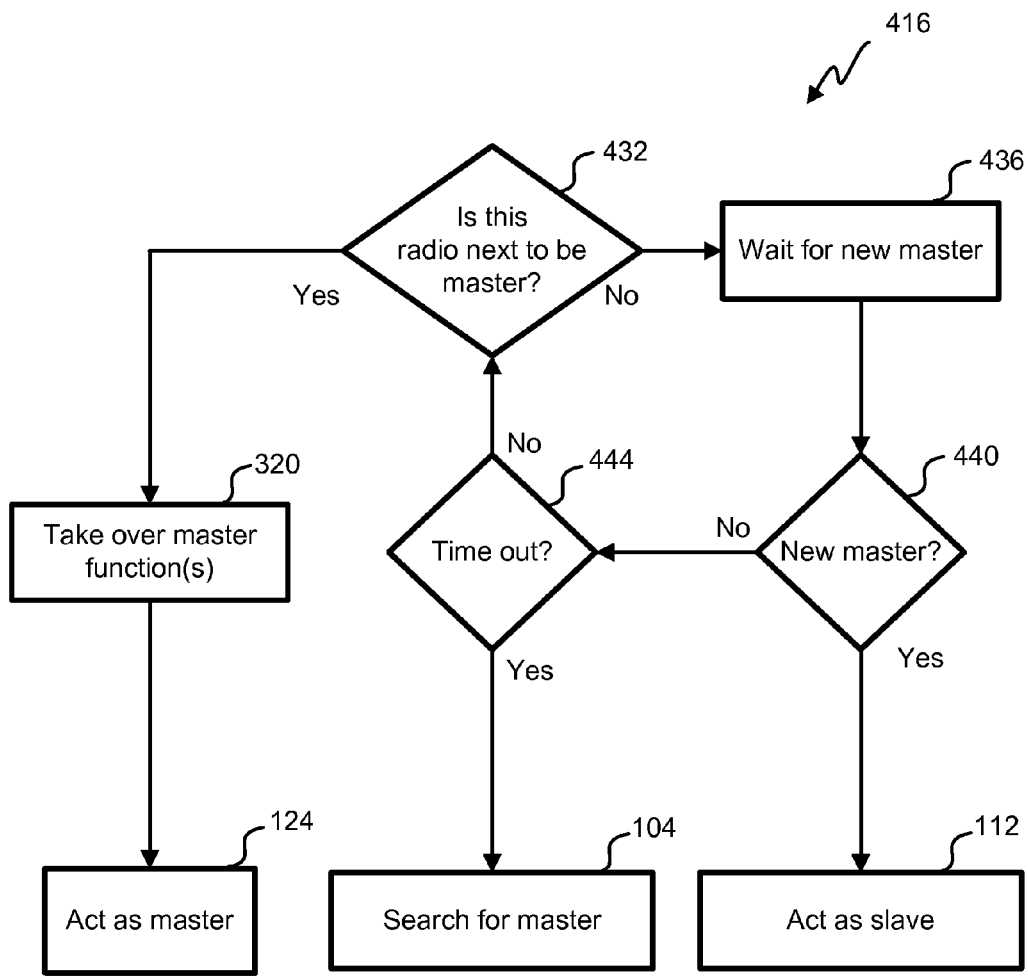

FIGS. 4A and 4B illustrate flowcharts of embodiments of processes for a multivoice radio, acting as a slave in a multivoice system, to act as a master radio in the multivoice system upon determining a previous master radio is no longer transmitting. For example, the previous master could have been turned off, or the previous master and the multivoice radio could be separated so that the previous master and the multivoice radio are no longer in radio contact with each other. In some embodiments, slave radios still communicate with each other after the previous master is no longer transmitting by the slave radios transmitting during their assigned transmission slots. A first slave can use information transmitted from one or more other slaves to determine whether or not the first slave should become a master radio. Signal strength from the previous master before losing communication with the previous master may also be used.

In FIG. 4A, process 400 begins with a multivoice radio acting as a slave, step 112, to a second radio (an MVR) in a multivoice system. The second radio is the previous master. In step 408, the multivoice radio determines that the multivoice radio is no longer receiving transmission from the second radio. In some embodiments step 408 is performed by the multivoice radio receiving transmission from the second radio and the transmission from the second radio is below a power threshold level. In some embodiments, a master radio transmits during a specified transmission slot. When the multivoice radio no longer receives transmission during the specified transmission slot (e.g., a transmission that is below the power threshold level), the multivoice radio determines the multivoice radio is no longer receiving transmission from the second radio, where the second radio is acting as the master radio for the multivoice system. When the determination is made in step 408, process 400 flows to step 412 where the multivoice radio determines whether or not the multivoice radio is assigned a transmission slot in the multivoice system for transmitting audio communication (e.g., not in listen-only mode). In some embodiments, step 412 is used to determine whether or not there is another radio that is capable of becoming a master. In some embodiments a slave radio has a parameter that prevents the slave radio from becoming a master radio. If the multivoice radio is assigned a transmission slot (or in some embodiments if the multivoice radio can become a master radio, whether or not assigned a transmission slot), process 400 flows to process 416, discussed in FIG. 4B, to determine whether or not the multivoice radio is to become the master for the multivoice system.

If the multivoice radio determines that the multivoice radio occupies a transmission slot in step 412 (e.g., having been assigned a transmission slot by the master of the multivoice system), then process 400 flows to step 420 where the multivoice radio waits for a new master. In step 424, the multivoice radio determines whether or not a new master is transmitting. In some embodiments, the master radio of the multivoice system transmits during a known transmission slot (e.g., transmission slot 1). Another radio in the multivoice system, such as a slave assigned to transmission slot 2, could take over master function(s) and start transmitting during transmission slot 1; then the multivoice radio would know there is a new master for the multivoice system. When the multivoice radio determines a new master is transmitting, the multivoice radio returns to acting as a slave, step 112 (and in some embodiments would proceed to process 136 in FIG. 1E and determine there is a new master in step 138).

If a new master is not found in step 424, process 400 flows to step 428 where the multivoice radio determines whether a timeout period has expired for waiting for the new master. If the timeout period has not expired, then the multivoice radio waits for a new master, step 420. In some embodiments, if the timeout period has not expired, then the multivoice radio returns to acting as a slave, step 112. If the timeout period has expired and a new master has not taken control of the multivoice system, then the multivoice radio searches for a new master, step 104.

In FIG. 4B, process 416 starts at step 432 where the multivoice radio determines whether or not the multivoice radio is next in line to become the master of the multivoice system. In some embodiments, next in line is determined by a priority algorithm built into the multivoice system or programmed in as a parameter for the multivoice radio. In some embodiments, the next in line is based on a transmission slot assignment of a slave radio. For example, for a first slave radio assigned to transmission slot 2, a second slave radio assigned to transmission slot 3, and a third slave radio assigned to transmission slot 4, the next in line would be the first slave radio first, the second slave radio second, and the third slave radio third. If the multivoice radio is next to be master in step 432, the multivoice voice radio takes over master function(s), step 320 and acts as master, step 124.

If the multivoice radio is not next to be master in step 432, the multivoice radio waits for a new master, step 436. In step 440, the multivoice radio determines if there is a new master. If there is a new master, then the multivoice radio acts as a slave, step 112 (and in some embodiments, also proceeds to process 136 in FIG. 1E to determine a new master in step 138). If in step 440 a new master is not found, then the multivoice radio determines if a timeout period has expired, step 444. If the timeout period has expired, the multivoice radio searches for a master, step 104; if the timeout period has not expired, the multivoice radio returns to determining if the multivoice radio is next to be master, step 432.

In some embodiments, it is noted that there is a possibility of three different periods of "time." First, a time period that is subdivided into transmission slots for the time-division multiplexing; second, a wait period in step 436; and third, a timeout period in step 444. It is noted that a duration of the time period that is subdivided into transmission slots can be referred to as a cycle. And durations of the wait period and/or the timeout period can be based on an internal clock and/or a number of cycles based on assigned transmission slot. The following example is for a scenario where a master transmits during slot 0, a first slave transmits during slot 1, a second slave transmits during slot 2, and a third slave transmits during slot 4 (slot 3 being previously abandoned or not assigned). If the master radio stopped transmitting during slot 0, the first slave, the second slave, and the third slave would each follow steps 112 (act as slave), 408 (determine radio is no longer receiving transmission from master), and 412 (does this radio occupy a transmission slot) bringing them to process/step 416 (determine whether or not to become a master) in process 400. In some embodiments, determining that the master is no longer transmitting includes monitoring no transmission (or transmission below a threshold) during slot 0 for a given number of cycles (e.g., 1, 2, 3, 4, 5, 7, or 10 cycles). In step 432 (is this radio next to be master?) of process 416, the first slave would become master based on the first slave being assigned a transmission slot having a lowest number compared to other transmission slot numbers. The second slave and the third slave would proceed to step 436 to wait for another slave to be master. In some embodiments, the wait period during step 436 is a number of cycles (e.g., 1, 2, 3, 4, or 5). In this example, the wait period is one cycle. If after one cycle the second first slave does not transmit during slot 0 (for whatever reason), then the second slave, in step 432, would be next in line based on transmission slot number and a number of cycles lapsed since determining the master is no longer transmitting in step 408; and the third slave would proceed to step 436 to wait another cycle. The timeout period in step 444 can be based on a number of cycles (e.g., 5, 10, 17, 20, 25, or 50) or a clock time (e.g., 0.10, 0.25, 0.5, 0.75, 1, or 2 seconds). Generally the time timeout period is longer than the wait period, but does not need to be. Following the example above, the second slave has a timeout period of three cycles because the second slave is in the second slot and the third slave has a timeout period two cycles longer than the second slave because the third slave is in the fourth slot.

Figure 4C:
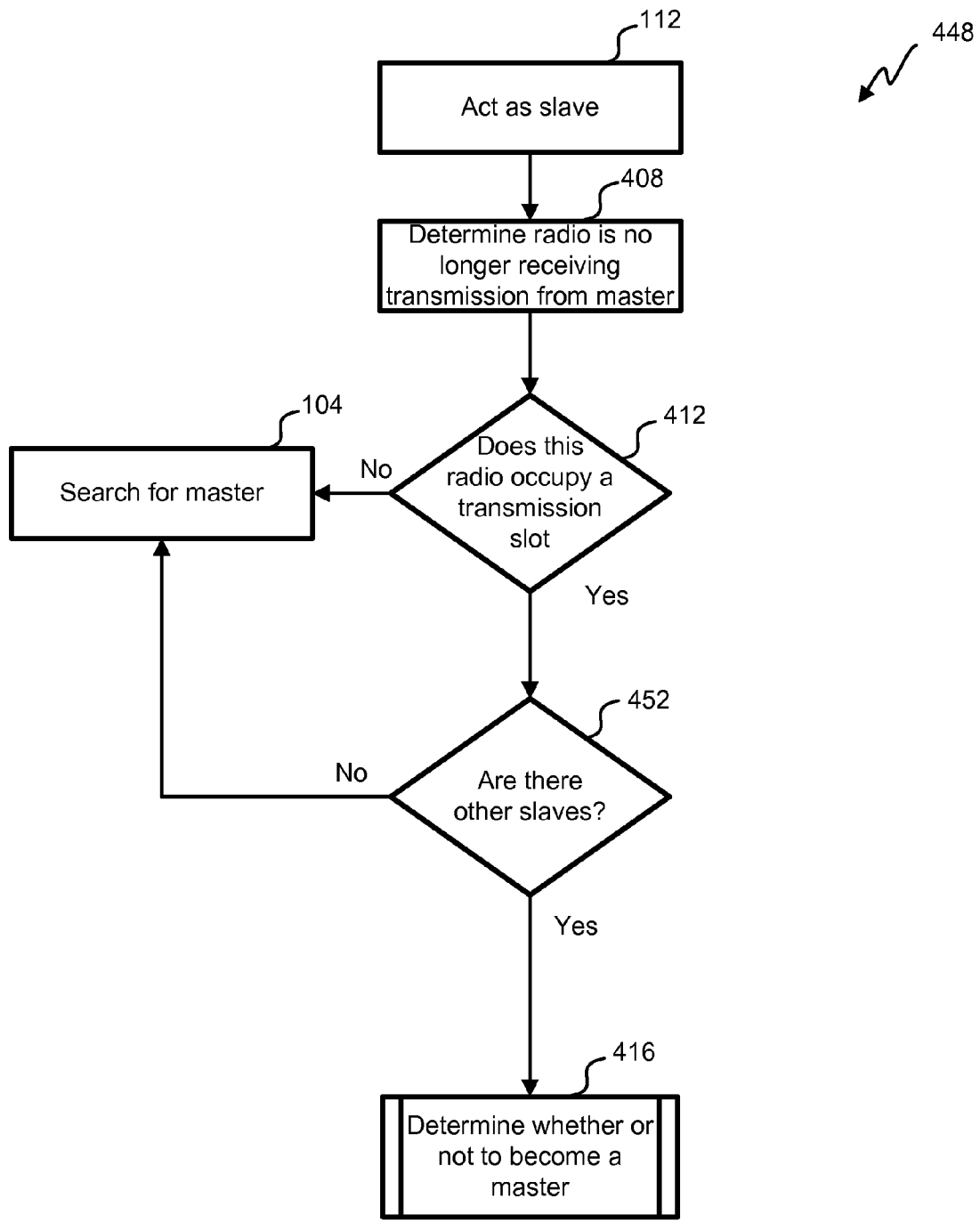
Figure 4D:
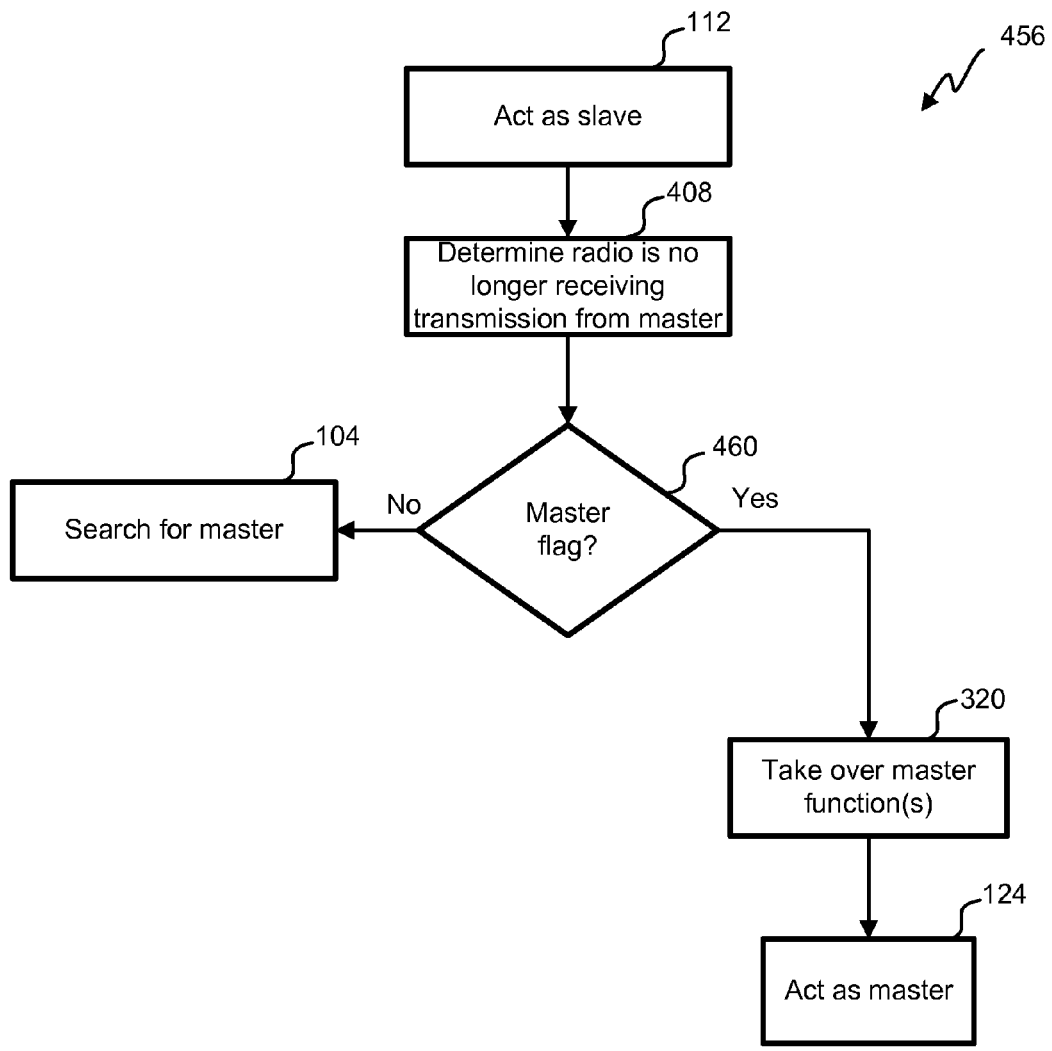

FIGS. 4C and 4D illustrate additional flowcharts of embodiments of processes for a multivoice radio, acting as a slave in a multivoice system, to act as a master radio in the multivoice system upon determining the previous master radio is no longer transmitting. It will be appreciated that steps in FIGS. 4A and 4B can be removed and/or new steps added based on desired functionality. FIGS. 4C and 4D are provided to give additional examples for a multivoice radio acting as a slave to become master of the multivoice system when a previous master stops transmitting (e.g., is separated from the multivoice radio).

The first three steps of process 448 in FIG. 4C are similar to the first three steps of process 400 in FIG. 4A. A multivoice radio acts as a slave in a multivoice system, step 112; the multivoice radio determines the multivoice radio is no longer receiving transmissions from a master radio of the multivoice system, step 408; and the multivoice radio determines whether or not the multivoice radio occupies a transmission slot of the multivoice system, step 412. If the multivoice radio does not occupy a transmission slot, then the multivoice radio searches for a master, step 104 instead of waiting as in step 420 of process 400.

If the multivoice radio is assigned a transmission slot in step 412, then the multivoice radio determines whether or not there are other slaves in the multivoice system, step 452. If there are no other slaves (e.g., the multivoice radio is the only slave assigned a transmission slot in the multivoice system), then the multivoice radio searches for a master, step 104. But if the multivoice radio determines there are other slaves in step 452, then process 448 flows to process/step 416 to determine whether or not the multivoice radio takes over master function(s).

Referring next to FIG. 4D, the first two steps of process 456 in FIG. 4D are similar to the first two steps of process 400 in FIG. 4A. A multivoice radio acts as a slave in a multivoice system, step 112; and the multivoice radio determines the multivoice radio is no longer receiving transmissions from a master radio of the multivoice system, step 408. After determining that the multivoice radio is no longer receiving transmissions from a master radio of the multivoice system in step 408, the multivoice radio determines whether or not the multivoice radio has a master flag parameter identified, step 460. If the multivoice radio does not have the master flag parameter, then the multivoice radio searches for a master, step 104. If the multivoice radio has the master flag parameter, then from step 460 the multivoice radio takes over master function(s), step 320, and acts as master, step 124.

Further variations are possible. For example, in some embodiments, if a certain number, a majority, or all slave radios have lost the communication with a master radio, then the multivoice radio takes over master function(s), step 320. In some embodiments, all slave radios that occupy transmission slots must lose communication with the master radio before another radio takes over the master function(s) in step 320.

Figure 5A:
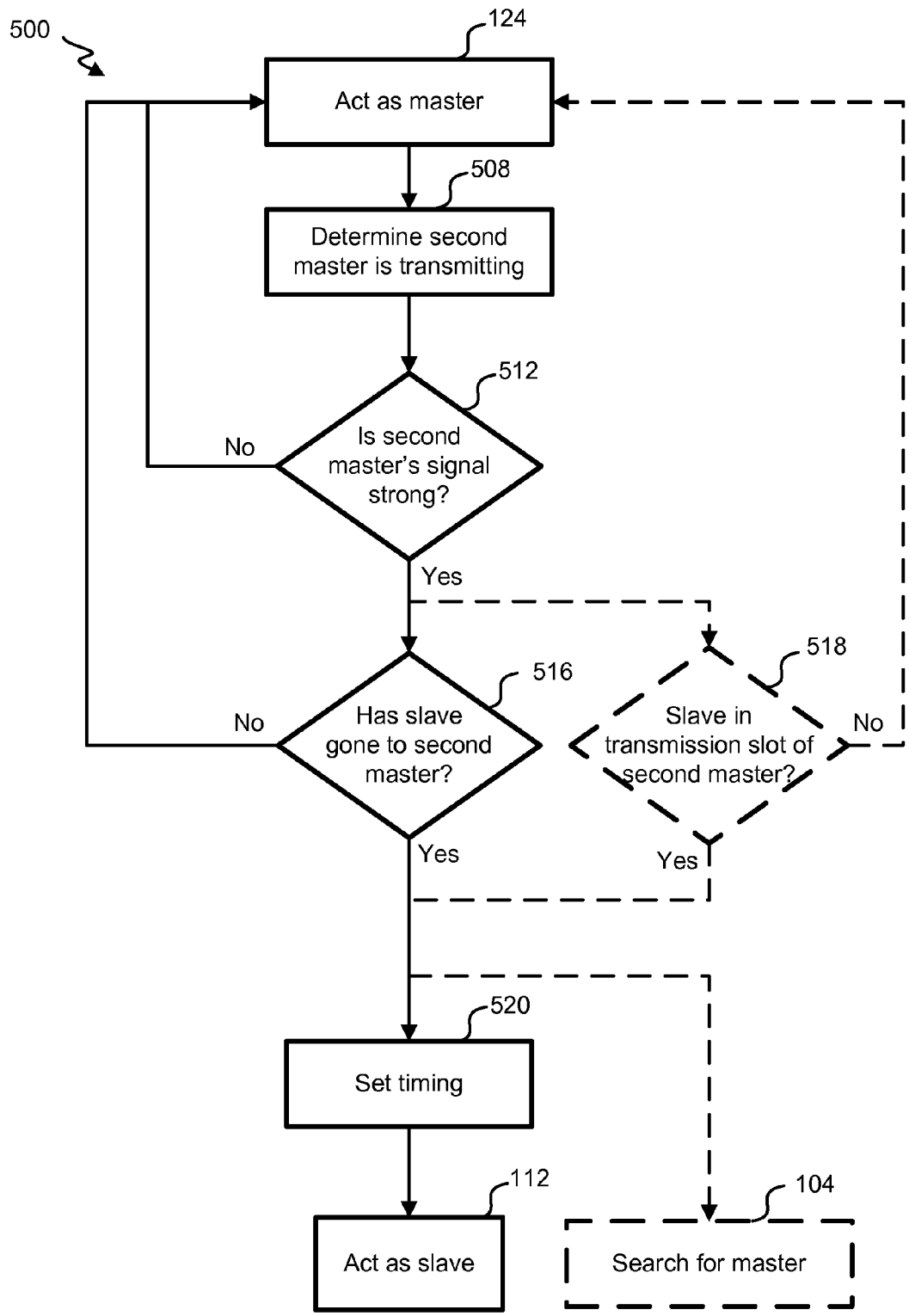
FIGS. 5A and 5B illustrate flowcharts of embodiments of processes for a first master radio to join a multivoice system of a second master radio.
Figure 5B:
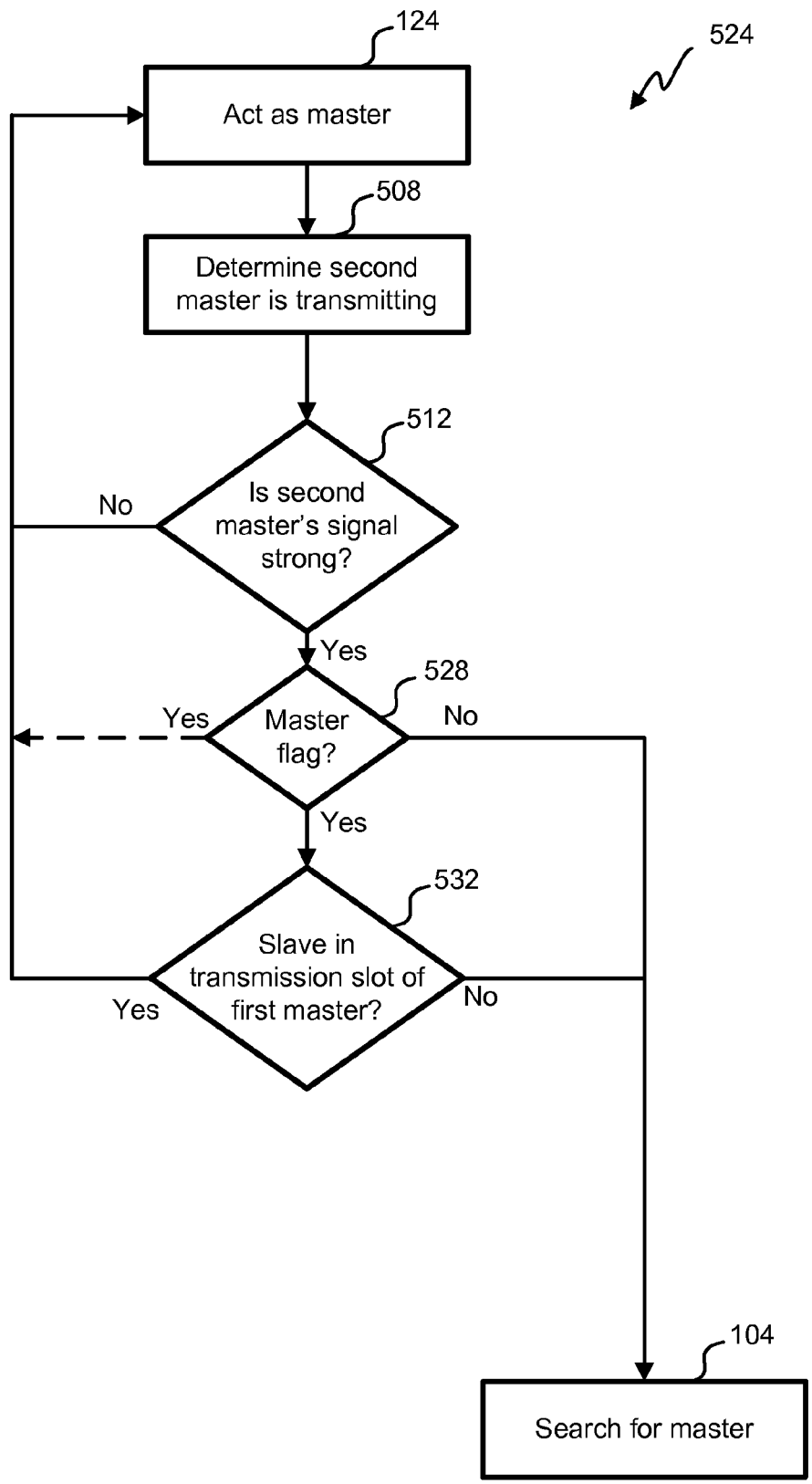

FIGS. 5A and 5B illustrate flowcharts of embodiments of processes for a first master radio to join a multivoice system of a second master radio. For example, there are twenty members of a SWAT (Special Weapons And Tactics) team, each member having an MVR (some MVRs in listen-only mode). A team of five SWAT team members enters a building while fifteen SWAT team members remain outside. The five SWAT team members lose radio contact with a first master radio, the first master radio being with a SWAT team member who remains outside the building. One MVR of the five SWAT team members takes over master function(s) as discussed above and becomes a second master. When the five SWAT team members rejoin the fifteen SWAT team members there are two master radios and two multivoice systems, a first master for the multivoice system of the fifteen SWAT team members and a second master for the multivoice system of the five SWAT team members. Several embodiments below disclose how radios from two multivoice systems can become part of one multivoice system.

Referring next to FIG. 5A, process 500 begins with a multivoice radio acting as a first master, step 124, for a first multivoice system. The multivoice radio searches to receive transmission from other master radios. If another master radio is found, then the multivoice radio determines that a second master, of a second multivoice system, is transmitting, step 508, and process 500 flows to step 512. In step 512, the multivoice radio determines whether or not the second master's signal is strong. In some embodiments, determining whether or not the second master's signal is strong is done using a received signal strength indicator from an RF section of the multivoice radio. If the received signal is weak, that may indicate that the second master is too far away or at and edge of a range of the multivoice radio. If the signal is weak, a counter or timer may be used to ensure the second master stays in the area before the multivoice radio joins the second multivoice system. If the signal is weak, or not there long enough, then the multivoice radio continues to act as master, step 124, for the first multivoice system. In some embodiments, step 512 is skipped.

If the second master's signal is strong enough in step 512 (e.g., above a specified threshold), the multivoice radio determines whether or not one, some, or all slaves in the first multivoice system have left to join the second multivoice system. In some embodiments, determining whether or not slave radios have left is performed by having a slave radio send information to other radios in a multivoice system that the slave is moving to another multivoice system. If slave radios in the first multivoice system have not left the first multivoice system in step 516, then the multivoice radio acts as master, step 124, for the first multivoice system.

If in step 516 the multivoice radio determines that one, some, or all radios have left the first multivoice system, the multivoice radio determines to join the second multivoice system and sets timing, step 520 to the second multivoice system and acts as a slave, step 112, in the second multivoice system. In some embodiments, if the multivoice radio determines that one, some, or all radios have left the first multivoice system in step 516, then the multivoice radio starts to search for a master, step 104 (and will likely find the second master in step 108 of process 100). In some embodiments, setting timing to the second master in step 520 allows the multivoice radio to more quickly join the second multivoice system than simply searching for a master as in step 104.

In some embodiments, whether or not a slave is in a transmission slot of the second multivoice system, step 518, is also used to determine whether or not the multivoice radio joins the second multivoice system. Step 518 can be used in place of, or in conjunction with, step 516 to form a second test. In some embodiments, both the test in step 516 and the test in step 518 must be satisfied before the multivoice radio joins the second multivoice system. In some embodiments, if either the test in step 516 or the test in 518 is met, then the multivoice radio joins the second multivoice system.

Referring next to process 524 in FIG. 5B, the first three steps in process 524 are similar to the first three steps in process 500 of FIG. 5A: a multivoice radio acts as a first master to a first multivoice system, step 124; the multivoice radio determines that a second master of a second multivoice system is transmitting, step 508; and the multivoice radio determines if the second master's signal is strong, step 512. If the multivoice radio determines that the second master's signal is strong in step 512, then the multivoice system determines whether or not the multivoice system has a master flag parameter, step 528. If the multivoice radio does not have the master flag parameter then the multivoice radio searches for a master, step 104. If the multivoice radio has the master flag parameter, then the multivoice radio continues to act as a master, step 124, or the multivoice radio determines whether or not there is a slave in a transmission slot of the first multivoice system, step 532. If there is slave in the first multivoice system, step 532, then the multivoice radio remains master of the first multivoice system, step 124. If there is not a slave in the first multivoice system, at step 532, then the multivoice radio searches for a master, step 104. In some embodiments, instead of searching for a master, step 104, in response to there not being a slave in the first multivoice system, the multivoice radio sets timing to the second multivoice system, step 520, and acts as a slave, step 112.

Figure 6:
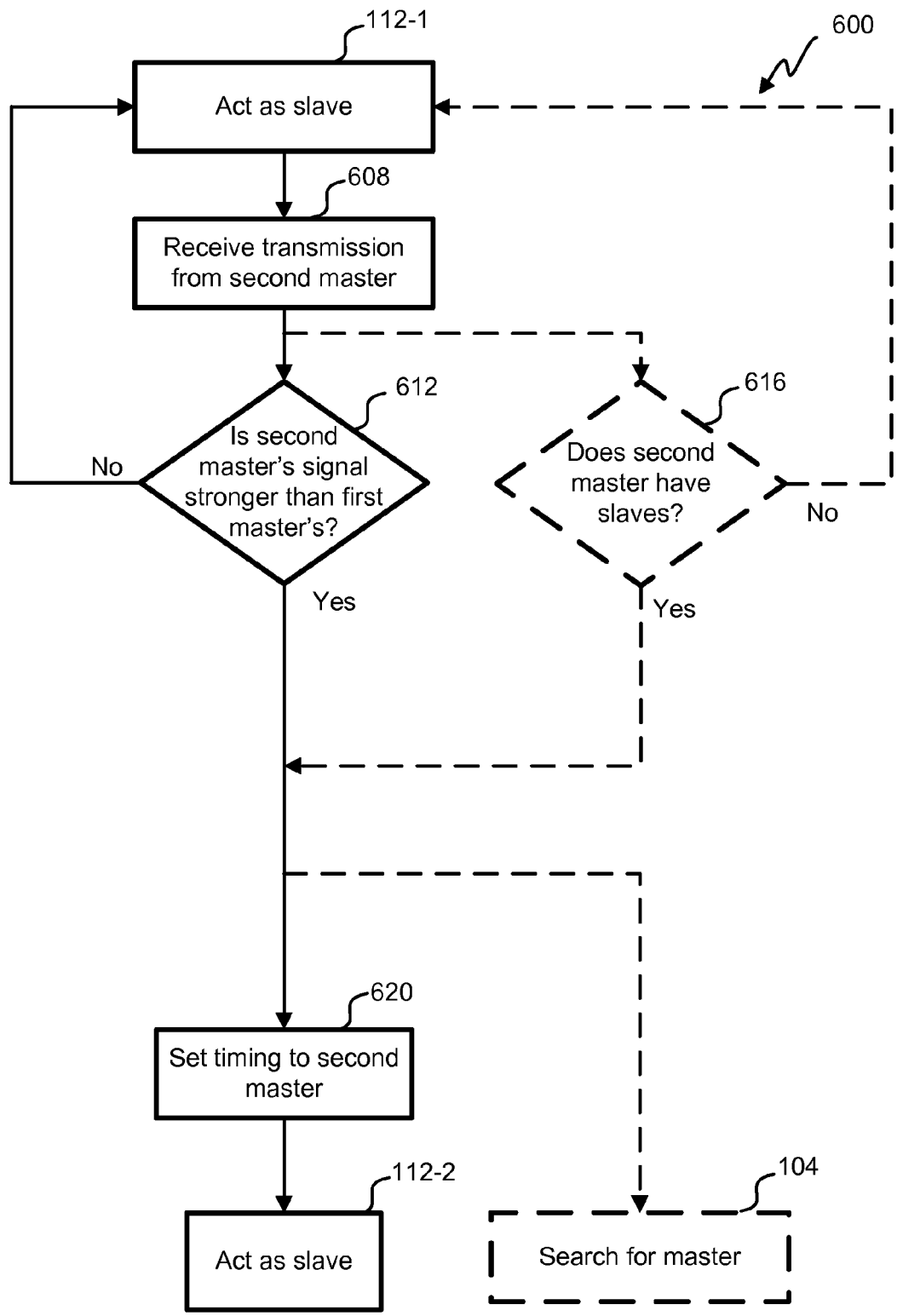
FIG. 6 illustrates a flowchart of an embodiment of a process for a slave radio to leave a first multivoice system having a first master to join a second multivoice system having a second master.

FIG. 6 illustrates a flowchart of an embodiment of a process 600 for a slave radio to leave a first multivoice system having a first master to join a second multivoice system having a second master. A multivoice radio enters process 600 as a slave radio, step 112-1, to a first master in a first multivoice system. In some embodiments, as part of step 112-1, the multivoice radio searches for other masters. In step 608, the multivoice radio receives transmission from a second master in a second multivoice system. In step 612, if transmission from the second master is stronger than transmission from the first master, the multivoice radio sets timing of the multivoice radio to the second master, step 620, and acts as a slave, step 112-2, to the second master. If in step 612 the signal of the second master is weaker than the signal of the first master, then the multivoice radio continues to act as a slave to the first master, step 112-1. For example, in some embodiments, the first master and the second master both transmit during one transmission slot. When the first master is closer to the multivoice radio than the second master, the multivoice radio receives transmissions from the first master because a received signal from the first master is stronger (assuming the first master and the second master have equal power output) than a received signal from the second master. When the first master and the second master are equidistant from multivoice radio, the first master and the second master effectively jam each other. But as the second master gets closer to the multivoice radio, the multivoice radio receives transmission from the second master because a received transmission from the second master is stronger than a received transmission from the first master. The multivoice radio recognizes that the multivoice radio is closer the second master and sets timing to the second master, step 620. In some situations, closeness is determined by radio transmission and not necessarily by physical distance. For example, a second master 100 feet away from the multivoice radio may be "closer" to the multivoice radio than a first master that is ten feet away but on an opposite side of a thick concrete wall having heavy rebar (transmissions from the first master to the multivoice radio being strongly attenuated by the concrete wall).

In some embodiments, after receiving transmission from the second master in step 608, the multivoice radio compares signal strength of the first master to signal strength of the second master, step 612. In some embodiments, comparing signal strength is done using the received signal strength indicator from an RF section of the multivoice radio. If the signal strength of either the first master or the second master is weak, that may indicate that the first master and/or the second master are at an edge of a range of the multivoice radio. If a signal from the second master radio is weak, a counter, or timer, may be used to make sure the second master stays in the area before joining with the second multivoice group. In some embodiments, step 612 is skipped and the multivoice radio joins the second multivoice system, step 620. In some embodiments, if the multivoice radio determines transmissions from the second master is stronger than transmissions from the first master, in step 612, then the multivoice radio starts to search for a master, step 104 (and will likely find the second master in step 108 of process 100), instead of setting timing to the second master, step 620. In some embodiments, setting timing to the second master in step 620 allows the multivoice radio to more quickly join the second multivoice system than simply searching for a master, as in step 104.

In some embodiments, whether or not there are slaves in the second multivoice system, step 616, is also used to determine whether or not the multivoice radio joins the second multivoice system. Step 616 can be used in place of, or in conjunction with, step 612 to form a second test. In some embodiments, both the test in step 612 and the test in step 616 must be satisfied before the multivoice radio joins the second multivoice system. In some embodiments, if either the test in step 612 or the test in 616 is met, then the multivoice radio joins the second multivoice system.

In some embodiments, the multivoice radio joins the second multivoice system after receiving a signal from the first master radio that the first master radio is joining the second multivoice system. In some embodiments, the multivoice radio simply joins whichever master has a stronger signal, because the first master and the second master may be transmitting during a same transmission slot.

Though specific examples were given in the above description, there can be several variations to the embodiments described. For example, when a master radio asks a slave radio to take over master function(s) there can be a three-way handshake: (1) the master radio transmits a request to the slave radio asking if the slave will the master; (2) the slave radio transmits a response to the master radio that the slave radio will be the master; and (3) the master radio either (a) transmits a response to the slave radio confirming that the master radio received the transmission from the slave radio for the slave radio to be the master, or (b) the master radio stops transmitting on a master transmission slot. In some embodiments, the transmission in (3)(a) above for the master radio transmitting a response to the slave radio is transmitted to all slave radios.

In some embodiments, a four-way handshake is made to transfer master function(s) from a master radio to a slave radio: (1) the slave radio transmits a request to the master radio for the slave radio to take the master function(s) (e.g., step 144 of process 136 in FIG. 1E), and (1-3) are the same as the three-way handshake in the previous paragraph.

In some embodiments, a slave has a switch so that the slave won't transfer from a first master to a second master.

In some embodiments, radio transmission includes direct sequence spread spectrum communication, frequency hopping spread spectrum communication, and/or single channel communication. In some embodiments, other multiple access protocols, such as code division multiple access (CDMA), Frequency-division multiple access (FDMA), and/or space division multiple access (SDMA) are used in conjunction with, or in lieu of, TDMA.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal compounders (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged, steps added, and/or steps removed depending on particular applications. One of ordinary skill in the art would recognize many variations, modifications, and alternatives. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A radio for switching between master radios using time division multiplexing, the radio comprising:
 a receiver configured to:
  receive wireless communication from a first master radio using time-division multiplexing, wherein:
   the first master radio provides a first timing synchronization data; and
   the first master radio is a mobile, handheld radio; and
  receive wireless communication from a second master radio using time-division multiplexing, wherein:
   the second master radio provides a second timing synchronization data; and
   the second master radio is a mobile, handheld radio;
 a transmitter configured to:
  transmit wireless communication to the first master radio using time-division multiplexing; and
  transmit wireless communication to the second master radio using time-division multiplexing; and
 electronics configured to:
  receive a transmission from the first master radio using the first timing synchronization data; and
  receive a transmission from the second master radio using the second timing synchronization data, wherein the radio does not power off between receiving the transmission from the first master radio and receiving the transmission from the second master radio.

2. The radio for switching between master radios as recited in claim 1, wherein the radio receives wireless communication from the first master radio and wireless communication from the second master radio during a same transmission slot.

3. The radio for switching between master radios as recited in claim 1, wherein the receiver is further configured to directly receive wireless communication from a slave radio of the second master radio.

4. The radio for switching between master radios as recited in claim 1, wherein the transmission from the first master radio comprises audio communication derived from a user of the first master radio.

5. The radio for switching between master radios as recited in claim 1, wherein the electronics are further configured to receive and implement a second assignment from the second master radio to transmit during a second transmission slot using the second timing synchronization data after receiving a first assignment from the first master radio to transmit during a first transmission slot using the first timing synchronization data.

6. A method for a slave radio to switch between master radios using time division multiplexing comprising:
receiving a transmission from a first master radio using a first time division multiple access (TDMA) timing synchronization data, wherein the first master radio is a mobile, handheld radio;
receiving a transmission from a second master radio, wherein:
the second master radio uses a second TDMA timing synchronization data; and
the second master radio is a mobile, handheld radio;
switching from implementing the first TDMA timing synchronization data to implementing the second TDMA timing synchronization data without powering off between receiving the transmission from the first master radio and receiving the transmission from the second master radio.

7. The method as recited in claim 6, wherein switching from implementing the first TDMA timing synchronization data to implementing the second TDMA timing synchronization data comprises receiving a second assignment from the second master radio to transmit during a second transmission slot using the second TDMA timing synchronization data after receiving a first assignment from the first master radio to transmit during a first transmission slot using the first TDMA timing synchronization data.

8. The method as recited in claim 6, further comprising:
comparing a first signal strength to a second signal strength, wherein:
the first signal strength is of a signal from the transmission from the first master radio; and
the second signal strength is of a signal from the transmission from the second master radio; and
determining to switch from implementing the first TDMA timing synchronization data to implementing the second TDMA timing synchronization data based on the second signal strength being greater than the first signal strength.

9. The method as recited in claim 8, further comprising waiting to verify the second master radio has a stronger received signal strength than the first master radio.

10. The method as recited in claim 6, further comprising:
comparing a first signal strength to a second signal strength, wherein:
the first signal strength is of a signal from the transmission from the first master radio; and
the second signal strength is of a signal from the transmission from the second master radio; and
performing a search for master routine based on the second signal strength being greater than the first signal strength.

11. The method as recited in claim 6, further comprising:
receiving data of a first number of slave radios in a group with the first master radio;
receiving data of a second number of slave radios in a group with the second master;
comparing the first number of slave radios to the second number of slave radios; and
switching from implementing the first TDMA timing synchronization data to implementing the second TDMA timing synchronization data based on the first number of slave radios being less than the second number of slave radios.

12. The method as recited in claim 6, further comprising:
receiving data that the first master radio became a slave to the second master radio; and
switching from implementing the first TDMA timing synchronization data to implementing the second TDMA timing synchronization data based on receiving data that the first master radio became a slave to the second master radio.

13. A radio system having multiple master radios and a slave radio switch between master radios, the radio system comprising:
a first master radio, wherein:
the first master radio is configured to transmit first time division multiple access (TDMA) timing synchronization data; and
the first master radio is a mobile, handheld radio;
a second master radio, wherein:
the second master radio is configured to transmit second TDMA timing synchronization data; and
the second master radio is a mobile, handheld radio; and
a slave radio configured to:
receive the first TDMA timing synchronization data from the first master radio;
implement the first TDMA timing synchronization data, such that a user of the slave radio can communicate with a user of the first master radio;
receive the second TDMA timing synchronization data from the second master radio; and
implement the second TDMA timing synchronization data, such that the user of the slave radio can communicate with a user of the second master radio, without turning off between implementing the first TDMA timing synchronization data and implementing the second TDMA timing synchronization data.

14. The radio system as recited in claim 13, wherein the slave radio is further configured to:
compare a first number of slave radios to a second number of slave radios; and
implement the second TDMA timing synchronization data based on the second number of slave radios being greater than the first number of slave radios;
the first number of slave radios is a number of slave radios of the first master radio: and
the second number of slave radios is a number of slave radios of the second master radio.

15. The radio system as recited in claim 13, wherein:
the slave radio is a mobile, handheld radio.

16. The radio system as recited in claim 13, wherein:
the first TDMA timing synchronization data is for a first group of radios communicating directly with each other; and
the second TDMA timing synchronization data is for a second group of radios communicating directly with each other.

17. The radio system as recited in claim 13, wherein:
the slave radio is a first slave radio;
the radio system further comprises a second slave radio; and
the first slave radio and the second slave radio transmit and receive directly with each other, without using a base station.

18. The radio system as recited in claim 13, wherein:
the slave radio is further configured to:
- compare a first signal strength to a second signal strength;
- compare a first number of slave radios to a second number of slave radios; and
- implement the second TDMA timing synchronization data based on:
  - the second signal strength being greater than the first signal strength; and
  - the second number of slave radios being greater than the first number of slave radios;

the first signal strength is of a signal from the first master radio;

the second signal strength is of a signal from the second master radio;

the first number of slave radios is a number of slave radios of the first master radio; and the second number of slave radios is a number of slave radios of the second master radio.

19. The radio system as recited in claim 13, wherein the slave radio is further configured to receive and implement a second assignment from the second master radio to transmit during a second transmission slot using the second TDMA timing synchronization data after receiving a first assignment from the first master radio to transmit during a first transmission slot using the first TDMA timing synchronization data.

20. The radio system as recited in claim 13, wherein the first master radio and the second master radio transmit during a same transmission slot.

\* \* \* \* \*